(12) United States Patent
Buddhikot et al.

(10) Patent No.: US 8,451,797 B2
(45) Date of Patent: *May 28, 2013

(54) METHOD AND SYSTEM FOR MOBILITY ACROSS HETEROGENEOUS ADDRESS SPACES

(75) Inventors: Milind M. Buddhikot, Cliffwood, NJ (US); Adiseshu Hari, Matawan, NJ (US); Scott C. Miller, Freehold, NJ (US); Kundan Narendra Singh, New York, NY (US)

(73) Assignee: Alcaltel Lucent, Paris (FR)

( * ) Notice: Subject to any disclaimer, the term of this patent is extended or adjusted under 35 U.S.C. 154(b) by 625 days.

This patent is subject to a terminal disclaimer.

(21) Appl. No.: 12/618,994

(22) Filed: Nov. 16, 2009

(65) Prior Publication Data

US 2010/0061309 A1    Mar. 11, 2010

Related U.S. Application Data

(60) Continuation of application No. 12/252,472, filed on Oct. 16, 2008, now Pat. No. 7,630,341, which is a division of application No. 10/618,880, filed on Jul. 14, 2003, now Pat. No. 7,453,852.

(51) Int. Cl.
*H04W 4/00* (2009.01)
*H04L 12/28* (2006.01)

(52) U.S. Cl.
USPC .......................................... 370/331; 370/401

(58) Field of Classification Search
None
See application file for complete search history.

(56) References Cited

U.S. PATENT DOCUMENTS

| 6,317,028 | B1 | 11/2001 | Valiulis |
| 6,345,043 | B1 | 2/2002 | Hsu |
| 6,442,616 | B1 | 8/2002 | Inoue et al. |
| 6,680,923 | B1 | 1/2004 | Leon |
| 6,725,047 | B1 * | 4/2004 | Farley et al. ............... 455/456.3 |
| 7,006,467 | B2 | 2/2006 | Anton et al. |
| 7,269,173 | B2 | 9/2007 | Iyer et al. |
| 7,356,009 | B1 * | 4/2008 | Meier et al. .................. 370/338 |
| 7,453,852 | B2 | 11/2008 | Buddhikot et al. |
| 2001/0048744 | A1 | 12/2001 | Kimura |
| 2002/0154624 | A1 | 10/2002 | Oishi et al. |
| 2002/0161927 | A1 | 10/2002 | Inoue et al. |

(Continued)

OTHER PUBLICATIONS

VIP: A Protocol Providing Host Mobility (Communications of the ACM, Aug. 1994).

(Continued)

*Primary Examiner* — Eunsook Choi
(74) *Attorney, Agent, or Firm* — Wall & Tong, LLP

(57) ABSTRACT

A mobile node includes a processor, a network interface, and a storage device having computer program code for execution by the processor. The computer program code includes a network layer for transmitting and receiving packets and an intermediate driver that transmits packets to the network layer and receives packets from the network layer using a virtual interne protocol (IP) address to identify the mobile node. The intermediate driver transmits packets to the network interface and receives packets from the network interface using a routable actual IP address to identify the mobile node. The intermediate driver permits the actual IP address to change when the mobile node moves from a first subnet to a second subnet without a corresponding change in the virtual IP address. A corresponding NAT associates the virtual IP address with a second actual IP address when the NAT is notified that the mobile node is in the second subnet.

21 Claims, 15 Drawing Sheets

U.S. PATENT DOCUMENTS

| | | | |
|---|---|---|---|
| 2002/0191562 A1* | 12/2002 | Kumaki et al. | 370/331 |
| 2002/0191576 A1* | 12/2002 | Inoue et al. | 370/338 |
| 2002/0194385 A1 | 12/2002 | Linder et al. | |
| 2003/0172142 A1 | 9/2003 | Su | |
| 2003/0179775 A1 | 9/2003 | Carolan et al. | |
| 2003/0185236 A1 | 10/2003 | Asano et al. | |
| 2003/0212821 A1 | 11/2003 | Gillies et al. | |
| 2003/0233568 A1* | 12/2003 | Maufer et al. | 713/200 |
| 2004/0028009 A1 | 2/2004 | Dorenbosch et al. | |
| 2004/0085931 A1 | 5/2004 | Rezalifar | |
| 2004/0090958 A1* | 5/2004 | Park et al. | 370/389 |
| 2004/0122976 A1* | 6/2004 | Dutta et al. | 709/245 |
| 2004/0203765 A1 | 10/2004 | Das et al. | |
| 2004/0249974 A1* | 12/2004 | Alkhatib et al. | 709/245 |
| 2005/0277418 A1* | 12/2005 | Singhal et al. | 455/439 |

OTHER PUBLICATIONS

Bhagwat, Pravin, Perkin, Charles, and Tripathi, Satish, "Network Layer Mobility: An Architecture and Survey," IEEE Personal Communications, 11 pages, Jun. 1996.

Braun, Torsten, Einsiedler, Hans Joachim, Scheidegger, Matthias, Stattenberger, Gunther, "A Linux Implementation of a Differentiated Services Router," Institute of Computer Science and Applied Mathematics, University of Berne, 12 pages.

Dornan, Andy, "CDMA and 3G Cellular Networks," www.networkmagazine.com/article/NMG.html20000831S0006.html, 4 pages, visited Mar. 31, 2003.

Hayes, Vic, Chair IEEE P802.11, (Sep. 1990), Lucent Technologies, Tutorial on 802.11 to 802, doc.: IEEE P802.11-96/49A Rev.1 to 49E, 70 pages, Mar. 1996.

© 1999 Microsoft Corporation, Microsoft Windows 2000 Server, Operating System, "Virtual Private Networking in Windows 2000: An Overview," White Paper, 24 pages.

C. Perkins, Editor, Network Working Group, Request for Comments: 2002, Category: Standards Track, "IP Mobility Support," IBM, www.ietf.org/rfc/rfc2002.txt.html, 32 pages, Oct. 1996.

RFC 2131 (Mar. 1997).

RFC 3456 (Jan. 2003).

* cited by examiner

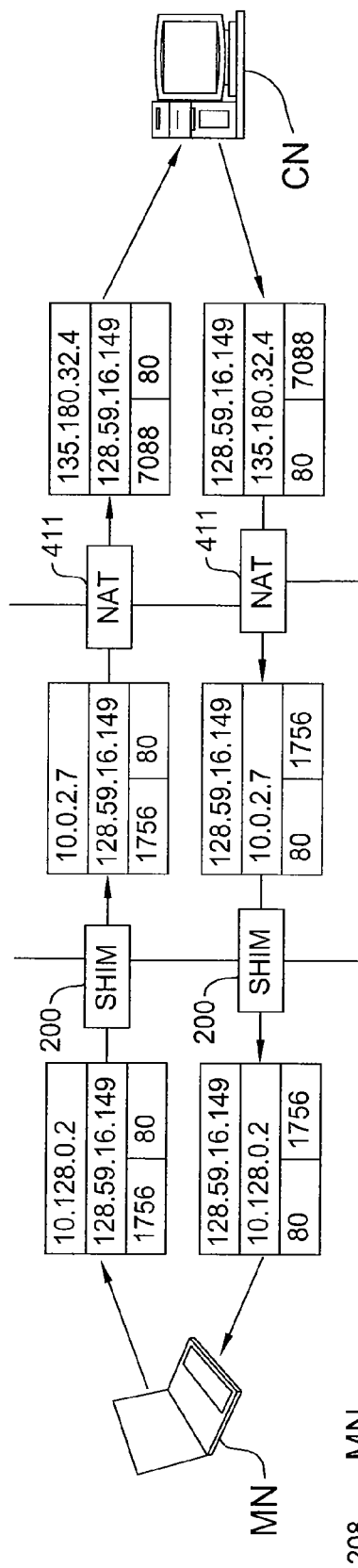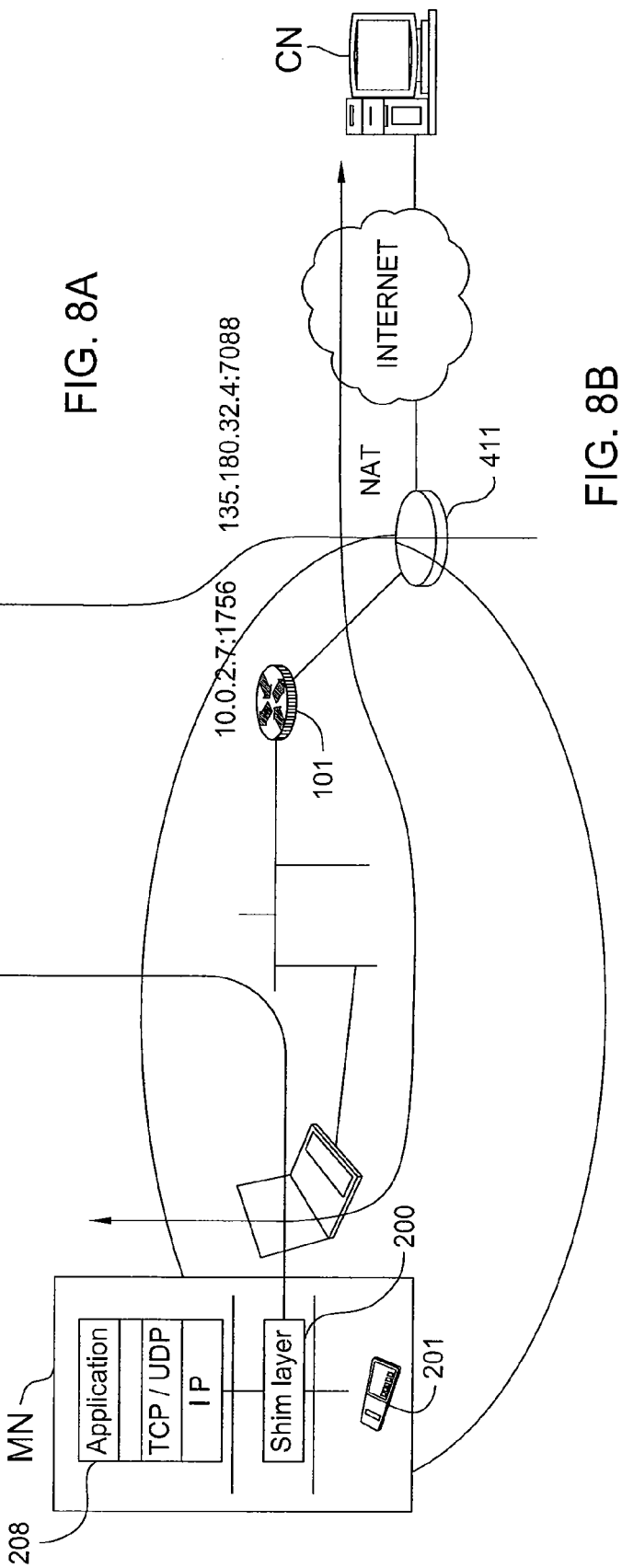
FIG. 8A
FIG. 8B

METHOD AND SYSTEM FOR MOBILITY ACROSS HETEROGENEOUS ADDRESS SPACES

CROSS-REFERENCE TO RELATED APPLICATION

This application is a continuation of U.S. patent application Ser. No. 12/252,472, filed on Oct. 16, 2008, now U.S. Pat. No. 7,630,341 entitled METHOD AND SYSTEM FOR MOBILITY ACROSS HETEROGENEOUS ADDRESS SPACES, which application is a divisional of U.S. patent application Ser. No. 10/618,880, filed on Jul. 14, 2003, entitled METHOD AND SYSTEM FOR MOBILITY ACROSS HETEROGENEOUS ADDRESS SPACES, now U.S. Pat. No. 7,453,852. The prior application and patent are hereby incorporated herein by reference in their entirety.

FIELD OF THE INVENTION

The present invention relates to mobile communications.

BACKGROUND

Current trends indicate that the Internet address space will be strained further as the deployment of new wireless access networks (e.g.: CDMA2000, 802.11) enables diverse and potentially mobile end-systems such as telemetry devices, sensors, personal digital assistants, (PDAs), laptops to be connected to the Internet. In the past, Network Address Translation (NAT) devices have been widely used to combat the problem of exhaustion of IP address space. Given that widespread deployment of Internet Protocol version 6 (IPv6) networks is still not on the horizon, NAT will continue to be an attractive solution that offers added benefits such as frequent changes in addressing plans and easy support for large public networks without exhausting IP addresses.

Consider a heterogeneous network including a plurality of different service provider domains. These may include: two NATed IP networks with private address space and 802.11 infrastructure, a 3G network with private address space and a public address space campus network. Consider a mobile node (MN) connected to a public host corresponding node (CN) using transport control protocol/internet protocol (TCP/IP). The connection should be preserved when the MN moves from one access point to another, and from one network to another. However, any of the following scenarios can occur:

1. When the MN moves to a new 802.11 access point (AP) in the same subnet, the IP address of MN remains the same. However, the MN needs to detect that the signal strength from the older AP has reduced, and signal strength from the new AP has increased. The MN disassociates with the old AP and re-authenticates with the new AP.

2. When the MN moves from a first subnet A to a second subnet B, the routable IP address of MN changes. It acquires a new IP address using dynamic host configuration protocol (DHCP.) However, this breaks the existing TCP connection.

3. When the MN moves from one NAT domain to another, the IP address space, hence the mobile node's IP address, may change. The CN still sends the packets in the connection to the old NAT.

4. An MN with both 802.11 and 3G wireless interfaces may move from an 802.11 network to a 3G network and still wish to preserve the existing connections.

5. When the MN moves from a private address space to a public address space it acquires a new global public address. The private address is no longer valid in this public network.

SUMMARY OF THE INVENTION

A method for addressing a mobile node includes identifying a host at a level above a network level using an invariant virtual interne protocol (IP) address of the host, identifying the host at a network interface level using a routable actual IP address of the host, and changing the actual IP address of the host without varying the virtual IP address of the host as the mobile node moves intra-domain or interdomain.

A mobile node includes a processor, a network interface, and a storage device having computer program code therein for execution by the processor. The computer program code includes a network layer for transmitting and receiving packets, and an intermediate driver that transmits packets to the network layer and receives packets from the network layer using a virtual internet protocol (IP) address to identify the mobile node. The intermediate driver transmits packets to the network interface and receives packets from the network interface using a routable actual IP address to identify the mobile node. The intermediate driver permits the actual IP address to change when the mobile node moves intra-domain or inter-domain without a corresponding change in the virtual IP address.

A dynamic host configuration protocol (DHCP) server receives a DHCP request from a mobile node. The server assigns a routable actual IP address to the mobile node. The server also assigns a virtual IP address to the mobile node, where the virtual IP address does not change when the mobile node moves intra-domain. The server transmits a message to the mobile node containing the actual IP address and the virtual IP address.

A network address translation (NAT) device receives a plurality of packets identifying a virtual IP address of a mobile node coupled to the NAT device as a destination. The NAT device identifies an actual IP address of the mobile node based on the virtual IP address. The NAT device is capable of associating a first actual IP address with the mobile node while the mobile node is located in a first subnet. The NAT device associates a second actual IP address of the mobile node with the same virtual IP address when the NAT device is notified of mobility of the mobile node. The NAT device routes the packets to the mobile node using the first IP address when the mobile node is in the first subnet and the second IP address when the mobile node is in the second subnet.

BRIEF DESCRIPTION OF THE DRAWINGS

FIGS. 8A and 8B show the address translation that takes place in the mobile node of FIG. 2 after the mobile node moves to the second subnet.

DETAILED DESCRIPTION

DHCP

Figure 1:
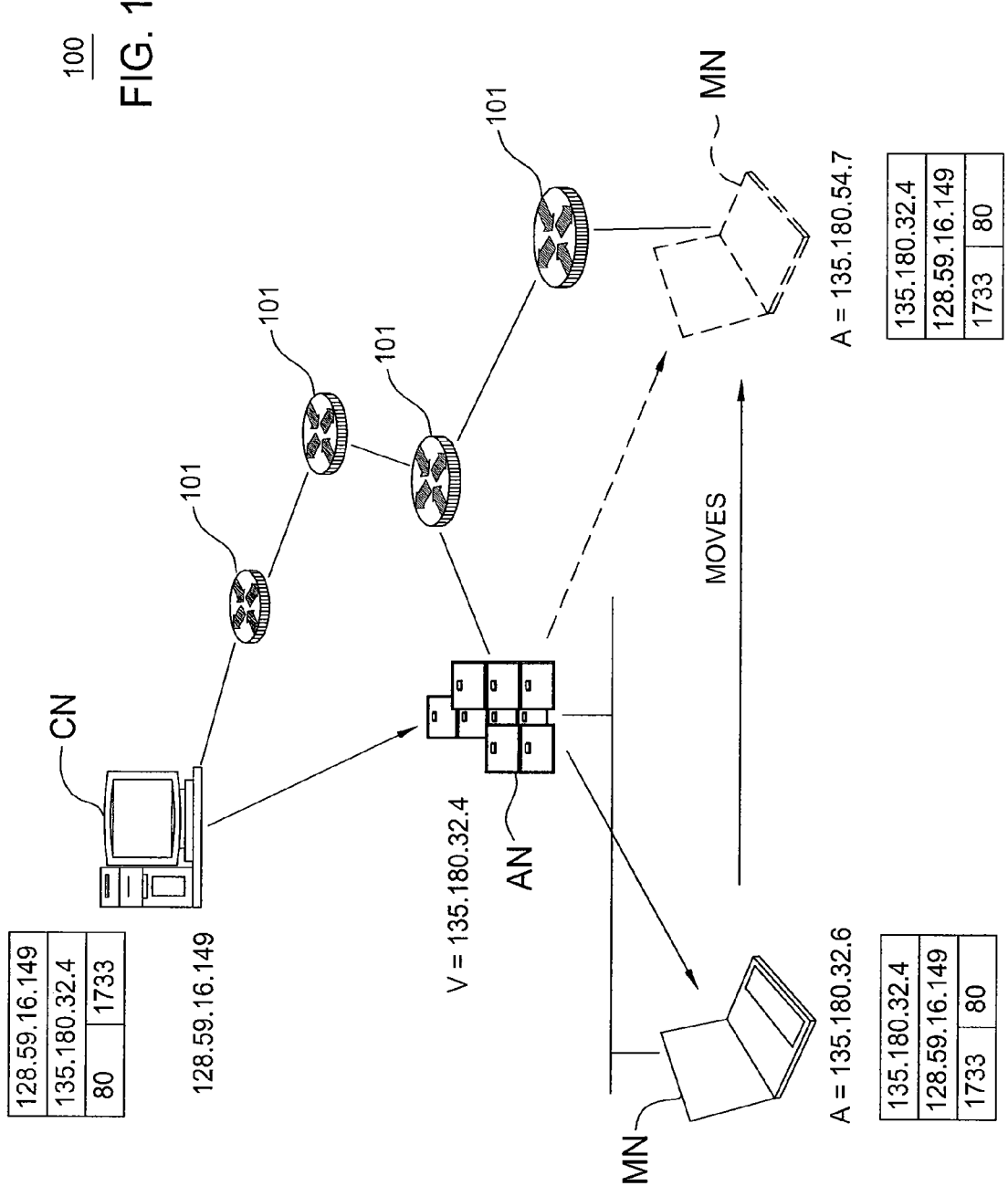
FIG. 1 shows an exemplary mobile communications system using virtual and actual IP addresses.

The exemplary DHCP protocol extends the standard DHCP protocol to include virtual addresses. DHCP is a client-server protocol used for passing configuration information (e.g., IP address) to hosts on a TCP/IP network. It allows automatic allocation of reusable network addresses. The host acts as a DHCP client and discovers the DHCP server in the network by broadcasting a DISCOVER message to the broadcast IP address, 255.255.255.255. The DHCP server in the same network sends an OFFER message to the client indicating that the client can contact this server for further information. The client then REQUESTs the DHCP configuration parameters from the server. The server sends an ACK message to the client indicating the configuration information, including the IP address and the lease time until which the IP address and other configuration parameters will be valid. The client should renew the lease before it expires, by sending another REQUEST to the server. In one example, a node in the same network as the DHCP server (S), e.g., node A, obtains the IP address from S directly, whereas a node B from a different network than S uses a DHCP relay agent (R). The relay agent receives the client broadcast request from B and forwards it to the server S using unicast. The DHCP server S knows the subnet of the client from the relay-agent address in the request. The client IP address is allocated based on the subnet in which the relay agent resides.

Network Address Translation

Network address translation (NAT) is a technique for translating one set of IP addresses known in one network to another set of IP addresses known in another. Typically, an organization maps its local inside private addresses to one or more global external public IP addresses. There are pre-defined private IP address spaces, e.g., 10.0.0.0 to 10.255.255.255 is one such range. These IP addresses do not have any global routing significance in the public internet. The source IP address in the outgoing IP packets from hosts with such an address needs to be translated from private to public, and the destination IP address in the incoming packets from public to private. NAT conserves the global IP address space by providing independent islands of private IP address networks. Usually the mapping is established when a new session (e.g., a TCP connection) is established from a node in the private network to a node in the public network. The mapping exists as long as the session is active.

Network address and port translation (NAPT) allows use of the same external public IP address for more than one internal private node by using TCP/user datagram protocol (TCP/UDP) port number for multiplexing multiple sessions. Some MobileNAT embodiments use NAPT in the architecture.

For example, when a host A, with private address 10.0.1.23, sends a TCP SYN connection establishment packet to an external node B with public address 128.59.16.149, the packet is intercepted by the NAT router (10.0.0.1). This NAT box with external IP 135.180.132.24, creates a mapping from the private address 10.0.1.23 and port 1987 to its external IP address 135.180.132.24 and port 1734. The packet is forwarded to node B, as if it was originated from the NAT box, by changing the source IP and port to 135.180.132.24 and 1734 respectively. The NAT intercepts incoming packets having a destination address 135.180.132.24 and port 1734, and changes the destination to 10.0.1.23 and the port to 1987. Node A thinks that it is connected to node B's IP, whereas node B thinks that it is connected to NAT's IP.

NATs are also useful in connecting the IPv6 islands with the core IPv4 Internet.

Midcom

NAT devices break application level protocols (e.g., Real Time Streaming Protocol (RTSP) and File Transport Protocol (FTP)) that use the host and port information in the application payload for signaling. For example, the RTSP client in private address space may use RTSP messages to ask the server in the public address space to stream the video to 10.0.1.23. However, this IP address is not visible for the public address node B. This is achieved using application level gateways on the NAT box, that can modify the application specific signaling messages for FTP or RTSP.

Exemplary embodiments can also use Midcom. IETF's Midcom (Middle-box communication) framework decomposes such middle-boxes like NAT and firewalls into the application independent (translation and filtering) and application dependent (policy decision and application specific message intercepting) functions. The router can just implement the application independent filtering and translation, that is in turn controlled by an application level gateway, either co-located or external, in conjunction with appropriate security (authentication and authorization) framework.

This description of the exemplary embodiments is intended to be read in connection with the accompanying drawings, which are to be considered part of the entire written description.

The embodiments described herein address the problem of mobility across address spaces delineated by NAT devices. These embodiments provide seamless mobility for devices such as laptops, PDAs and sensors with client initiated sessions from the private address space to the public address space. The general architecture is referred to below as, "MobileNAT," because address translation may occur in the mobile node and the NAT device. An exemplary MobileNAT system includes the following features:

1. Use of two IP addresses: an invariant "virtual IP address" for host identification at the application layer and an actual routable address at the network layer that changes when the mobile node moves. Because virtual address from a private address space can be used without any global routing significance, such virtual addresses do not deplete the IP address resource.

2. DHCP is used to distribute the virtual and actual IP addresses. A DHCP extension provides virtual IP address and other MobileNAT specific parameters.

3. A new signaling element called the Mobility Manager (MM) may be included. In some embodiments, an MM uses the Middle-box Communication (Midcom) framework to signal to the NATs the changes in packet processing rules in the event of node movement.

In some embodiments, MobileNAT can co-exist with Mobile IP functions and also, eliminate several Mobile IP drawbacks. In particular, overheads such as need for a Home Agent and Home address and use of UDP-in-IP tunnels with NATed domains can be eliminated in MobileNAT systems. Also, MobileNAT does not require any modifications to the access networks and therefore can be used to provide seamless mobility across heterogenous wireline and wireless networks.

Architecture of MobileNAT

Different domains may use different access mechanisms; for example, one domain may use 802.11 wireless LANs whereas other domain may use 3G wide area wireless access. Each NATed domain can be a layer-2 (e.g. switched ethernet) or layer-3 (e.g. IP) routed network. If it is a layer-3 IP routed domain, then it includes several layer-2 subnets that are interconnected by IP routers. A Mobile Node (MN) in such a case can experience three kinds of mobility: (1) layer-2 mobility within the same subnet, (2) layer-3 mobility across subnets, and (3) layer-3 mobility across adjacent domains. A mobile node (MN) may have several on-going TCP/IP connections (e.g: web, ftp, telnet, IMAP) and UDP/IP (e.g.: VOIP, RTP) traffic which are collectively referred to as active sessions. In FIG. 1, a mobile node MN communicates with a corresponding node CN by way of an anchor node AN and at least one router 101.

One problem with the IP address is that it is overloaded with two functionalities: (a) host identification by the TCP/UDP layer, and (b) network attachment information for routing. Consider a mobile node (MN) with IP address 135.180.32.4 connected to a corresponding node (CN) with IP address 128.59.16.149 using TCP. Suppose the local and remote port numbers at MN is 1733 and 80, respectively, for this connection. The TCP layer at MN maintains the five-tuple [TCP, 135.180.32.4, 128.59.16.149, 1733, 80] identifying this connection. Similarly the TCP layer in CN identifies the connection as [TCP, 128.59.16.149, 135.180.32.4, 80, 1733]. When the MN moves to a new network, and gets a new IP address (e.g., 135.180.34.7), the original TCP connection association breaks and the connection is lost.

One exemplary approach to solve this problem is to use two IP addresses as shown in FIG. 1.

Virtual IP address: A fixed and unique IP address is used for host identification that does not change on mobility. The virtual address is used by the TCP/IP stack and higher layer applications.

Actual IP address: A routable actual IP address is used for routing purposes, that can change when the host moves.

The fixed virtual IP address corresponds to a fixed (non-mobile) anchor node (AN) in the network. It is assumed that one or more mobility domains each include a homogenous address space such as IPv4 or IPv6 address space, and is delineated from the rest of the network by a respective AN. Using the same example, if the MN's virtual IP is 135.180.32.4, then the TCP association at CN will be [TCP, 128.59.16.149, 135.180.32.4, 80, 1733] (where the five-tuple represents [TCP, virtual IP, CN, source port and destination port]). CN sends the packets to this virtual IP, that is received by the AN and forwarded to the actual IP of the MN. When the MN moves, its actual IP changes. Now the AN can forward the packets to the new actual IP of MN.

Inside the MN, the virtual IP is exposed to the TCP/IP stack and higher layer applications, whereas the actual IP is used for actual routing of the packets.

Figure 2:
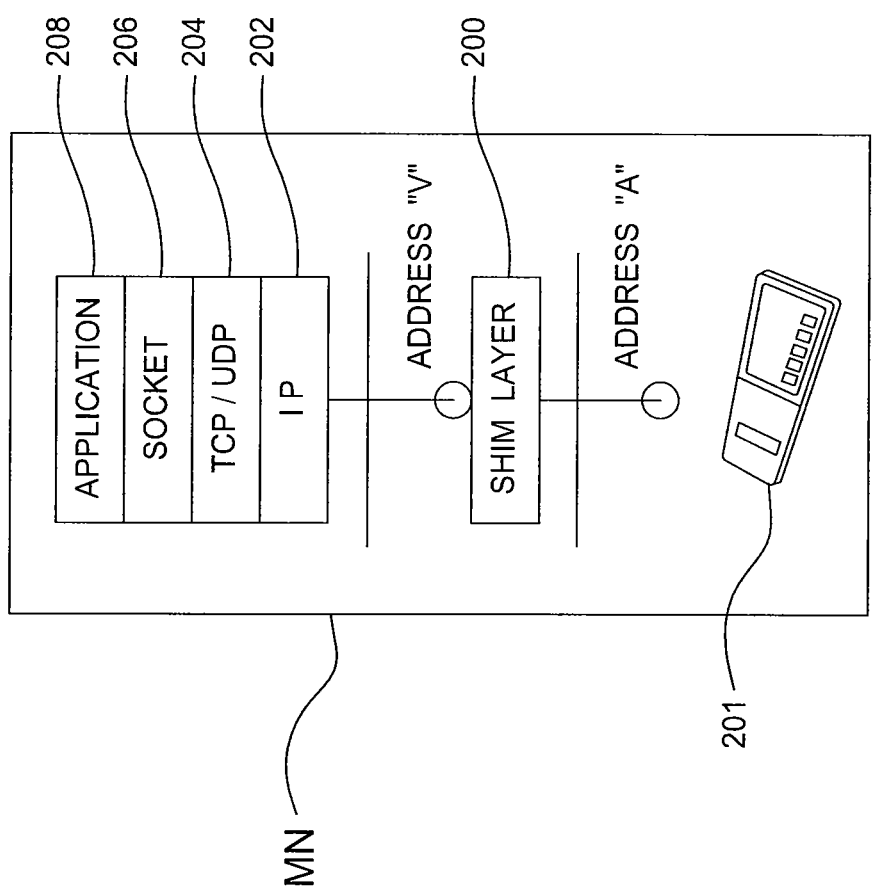
FIG. 2 shows the software architecture of the mobile node of FIG. 1.

FIG. 2 is a block diagram of the mobile node MN. A thin layer 200 is provided between the TCP/IP stack 202, 204 and the network interface 201 in the client machine to convert from actual IP to virtual IP and vice-versa. This layer is referred to herein as the shim layer 200. The address translation happens both in the client's shim layer 200 as well as at the anchor node (AN). The AN node therefore is a standard NAT or NAPT device. The packet translation is transparent to the CN, as well as the socket 206 and application 208.

Both the actual and the virtual IP addresses are unique and different. Preferably, the available address range is divided into an actual IP range and a virtual IP range. This division helps in intra-domain sessions as discussed below.

Figure 3B:
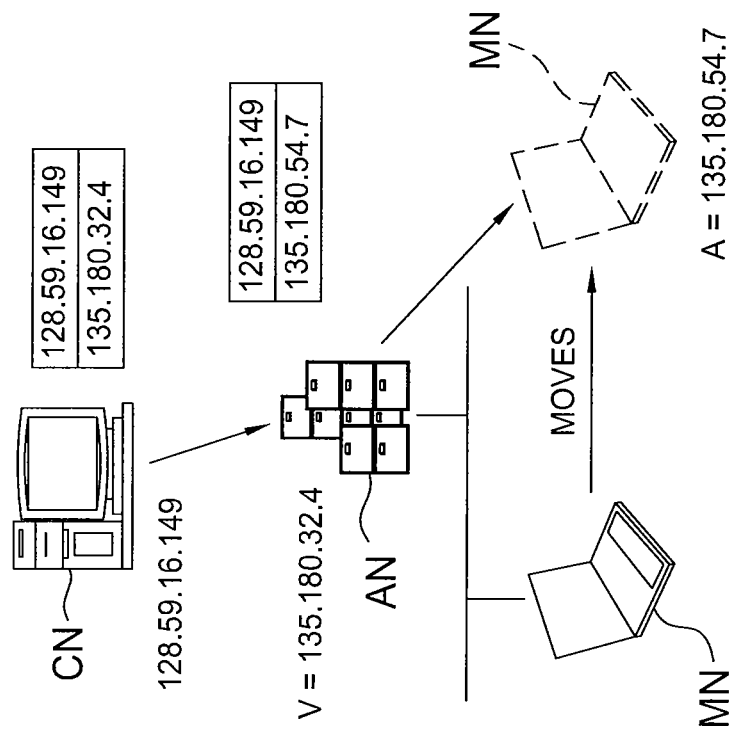
FIGS. 3A and 3B show two alternative techniques for forwarding packets to the mobile node of FIG. 1 after a mobility event that changes the actual IP address.
Figure 3A:
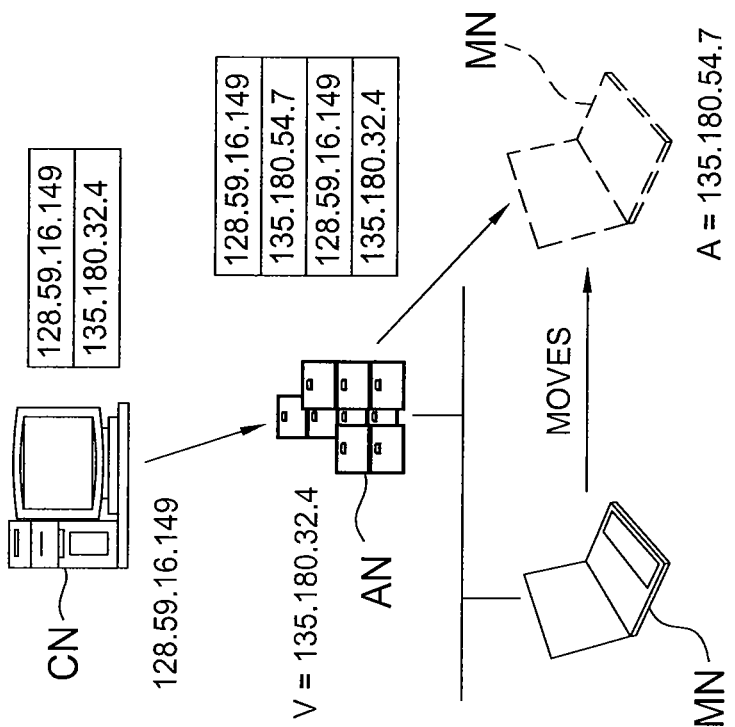

The packets from the AN to the MN can be forwarded in two modes as shown in FIGS. 3A and 3B:

Tunneling (FIG. 3A): In this mode an IP-in-IP tunnel is used to forward the packet from the AN to the MN. The outer IP header contains the tunnel address to the actual IP of the MN, whereas the inner IP header contains the virtual IP of the MN as known by the CN. The reverse traffic does not necessarily need a tunnel from MN to AN. Also, the source IP in the outer tunnel header from AN to MN can be that of the CN or the MN.

Translation (FIG. 3B): In this mode the IP header is modified such that the IP addresses are changed from virtual to actual IP of the MN.

The advantage of tunneling is that it involves less processing overhead. The disadvantage is the additional header, hence the increased packet size on the wireless link. For example, in the case of a Internet telephony application using G.729 audio codec with 20 ms packetization interval with 20 bytes payload, 12 bytes Real-Time Transport Protocol (RTP) header, 8 bytes UDP header and 20 bytes of IP header, each IP packet in translate mode will have a size of 60 bytes, whereas the size in tunnel mode is 80 bytes (33% more). In translation mode, one actual IP and one virtual IP address are used per mobile node. In tunnel mode, the same virtual IP address can be shared across multiple nodes, provided a private node does not talk to another private node with the same virtual IP address. The choice between tunnel or translate mode can be made by the client node or can be a domain-wide service provider policy. The chosen mode can be signaled using DHCP. If the network already has a NAT at the AN, then processing overhead in translation mode is not an issues since the existing NAT will already be performing translation.

DHCP may be used to allocate the virtual and actual IP of the MN. In some embodiments, a new DHCP option (shim layer address) is defined to request and allocate the virtual IP address. The MN requests the DHCP server to allocate a new virtual IP address by setting the shim layer address option to 0.0.0.0 in the request. The server allocates a virtual IP address for this MN, and returns it in the shim layer address option in the DHCP response (ACK). If the MN is requesting to renew a previously assigned virtual IP address, the MN puts the old shim layer address in this option. Typically a mobile node acquires a virtual and an actual IP address on initial boot. For subsequent change in the network, the node renews the old virtual IP address, and get a new actual IP address in each network.

Although most of the discussion below uses both actual and virtual IP addresses from the private address space, this is not a requirement. A simple translation scheme will work even if both the IP addresses are chosen from the public IP address space as long as the packets go through an intermediate NAT device. This can be relevant in the case of communication between nodes in IPv4 Internet and IPv6 NAT domains. Use of a public IP address as virtual or actual IP means that the address should be allocated from the external addresses available with the NAT device. This allows the external public node to send the packets to that address and still allows the NAT device to intercept and modify the packets. The choice of public virtual address and private actual address is useful for hosting services like web server from the private address space.

Mobility Manager

Consider a MN in a private address space connected to a CN in the public address space via a NAT device at the address space boundary. When the MN moves, and gets a new actual IP address, the mapping (packet processing rule) from the virtual IP to old actual IP should now be changed to a mapping from the same virtual IP to the new actual IP for the MN at the NAT for the existing connection.

Figure 4:
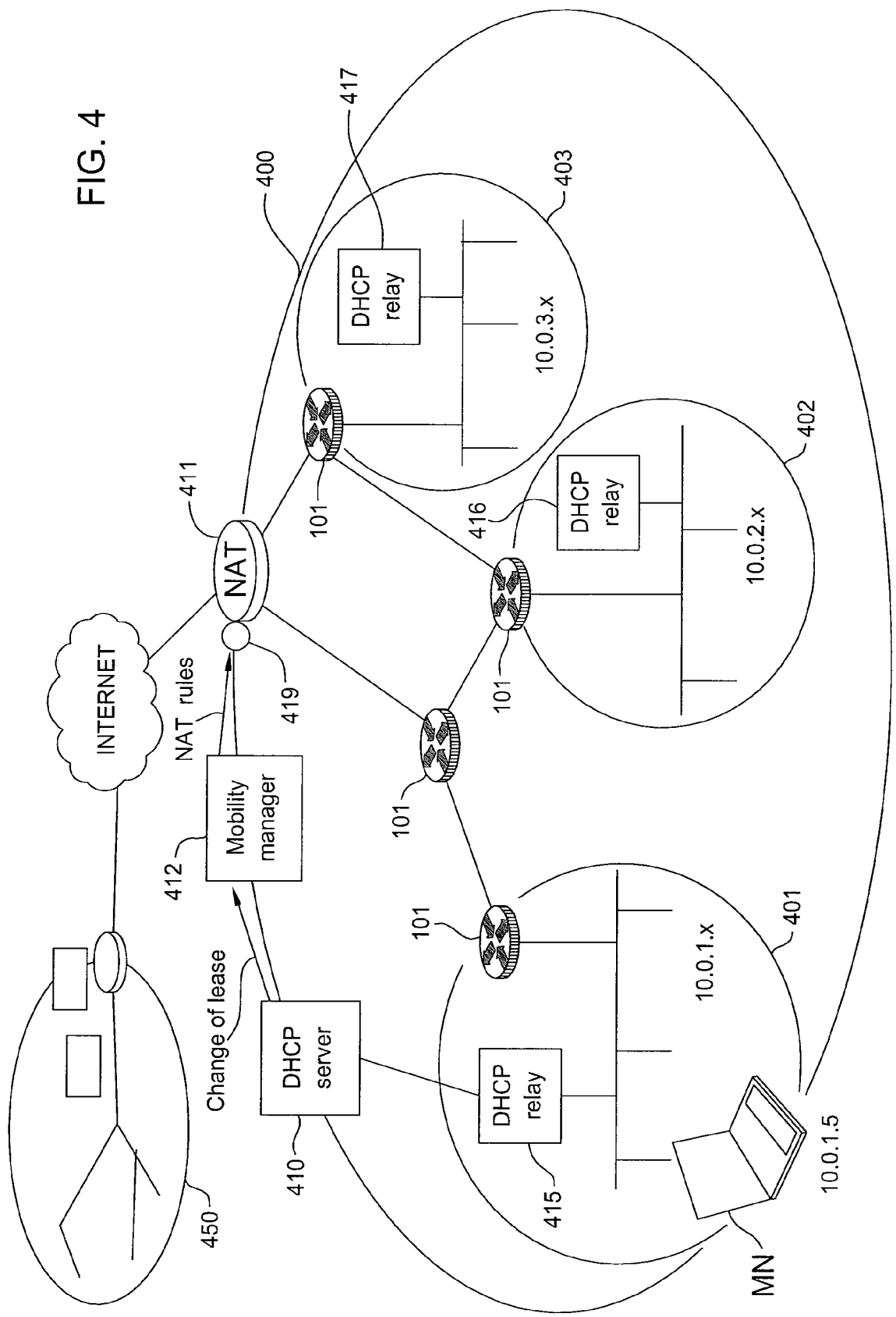
FIG. 4 shows the components of the NAT domain of FIG. 1.
Figure 5:
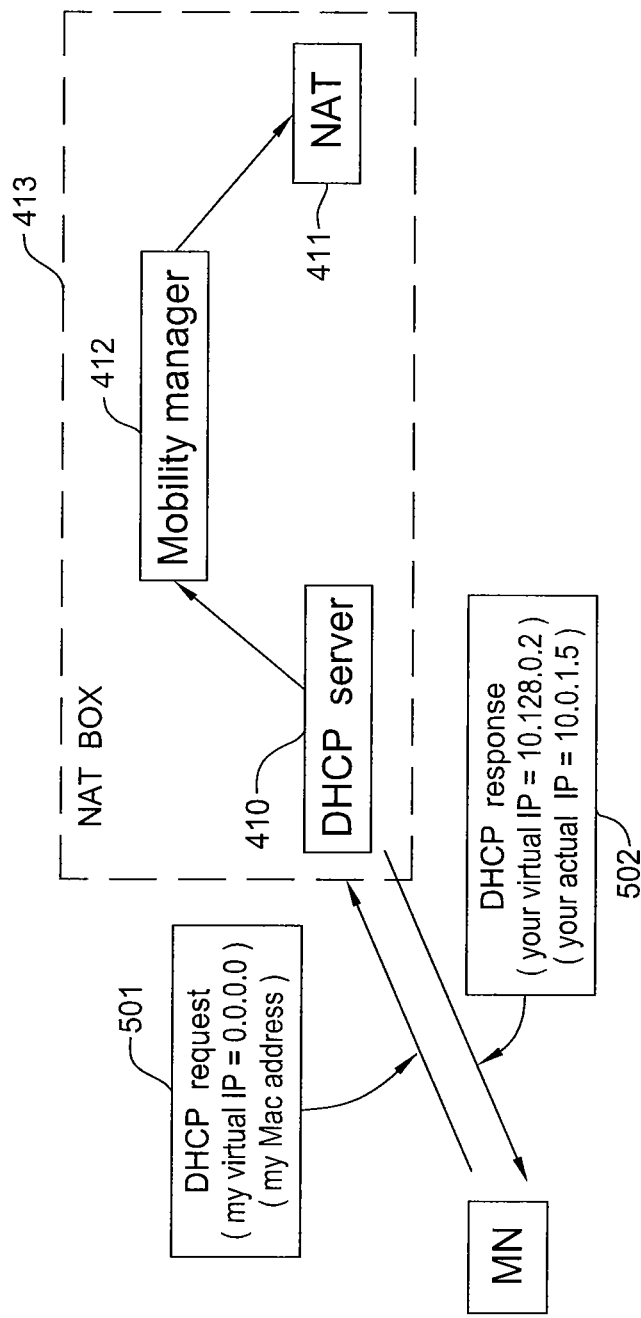
FIG. 5 shows a DHCP protocol event when the mobile node in the system of FIG. 1 boots.

Some embodiments include a new network component called mobility manager (MM) 412 for the NAT domain as shown in FIG. 4. A NAT domain 400 includes a plurality of subnets 401-403, each served by a respective DHCP relay 415-417. The NAT 411 serves as the boundary of the NAT domain 400. In some embodiments, every NAT domain 400, 450 has a MM 412, NAT 411 and a DHCP server 410. These three components may be included in a single physical box 413 (as shown in FIG. 5), or they may be implemented in three separate hardware and/or software components, as shown in FIG. 4. The MM 412 informs the NAT device 411 using the Midcom (Middle-box communication) protocol to change the packet processing rule for the existing connection. A Midcom agent 419 (shown as a small circle in FIG. 4) runs on the NAT box 411, receives the requests and updates the packet processing rules. The MM 412 receives the change in IP address indication from the DHCP server 410. The DHCP server 410 knows the actual and virtual IP address of the MN 412 and informs the MM every time the MN moves to a new actual IP location. In these embodiments, every mobile node knows the IP address of the MM in its domain, as this IP address is sent in a new DHCP options in the response from the DHCP server.

Dynamic Home Agent

Some features of MobileNAT can be considered analogous to a Mobile IP system in co-located mode that is reconfigured with the foreign agent (FA) located in the shim-layer (i.e., between the network layer software and the network interface card) and the home agent (HA) located in the NAT. However, MobileNAT has other advantages. For example, using MobileNAT, the MN does not need a fixed home agent, and it can dynamically detect and use a NAT as a home agent. Thus, the NAT can be viewed as a per-connection HA as opposed to the per-host HA. The MN can use one NAT as a HA for one connection, and another NAT as HA for another connection if the node moves from one NAT domain to another as discussed below. When the node moves to a new NAT domain, it uses the new NAT as the home agent for the new connections.

FIG. 5 shows the MN startup process. When the MN is started (initial boot), it sends a DHCP request (DISCOVER) 501 to the DHCP server 410 indicating that MN does not have a virtual IP address (In the request, the shim layer address option contains 0.0.0.0, and the media access control (MAC) layer address of MN is included) as shown in FIG. 5. The DHCP server 410 allocates a virtual IP of 10.128.0.2 from the free pool of virtual IP range (10.128.0.1-10.255.255.254), and an actual IP of 10.0.1.5 from the free pool of addresses in the actual IP range within this subnet (10.0.1.4-10.0.1.254). The server 410 sends MN a DHCP response 502 that includes virtual and actual IP addresses. The DHCP server 410 also informs the MM 412 to update the NAT processing rules of NAT 411. FIG. 5 also shows that the DHCP server 410, NAT 411 and MM 412 may all be contained within a single physical box, and may be implemented as separate processes that share processing, memory and storage hardware resources.

Figure 6A:
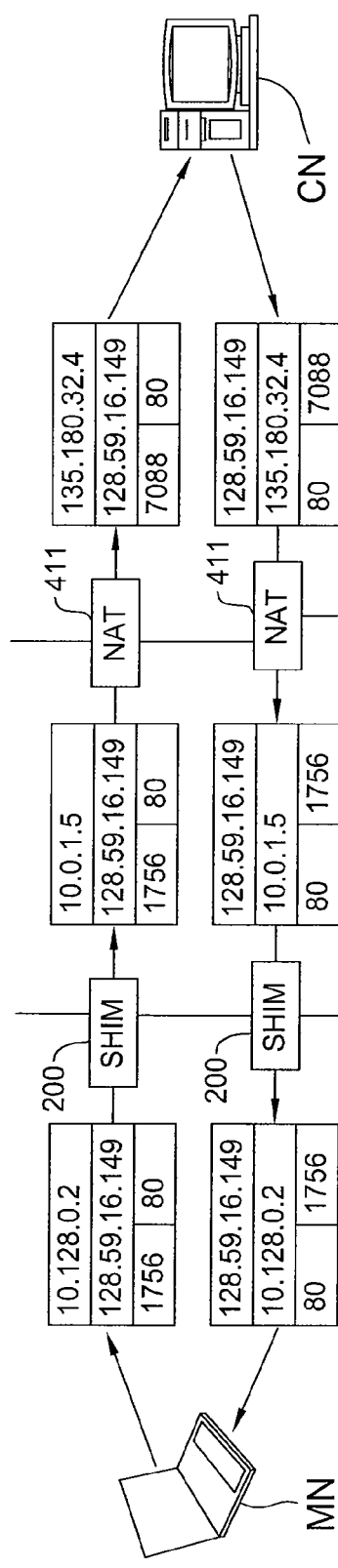
FIGS. 6A and 6B show the example of address translation that takes place in the mobile node of FIG. 2.
Figure 6B:
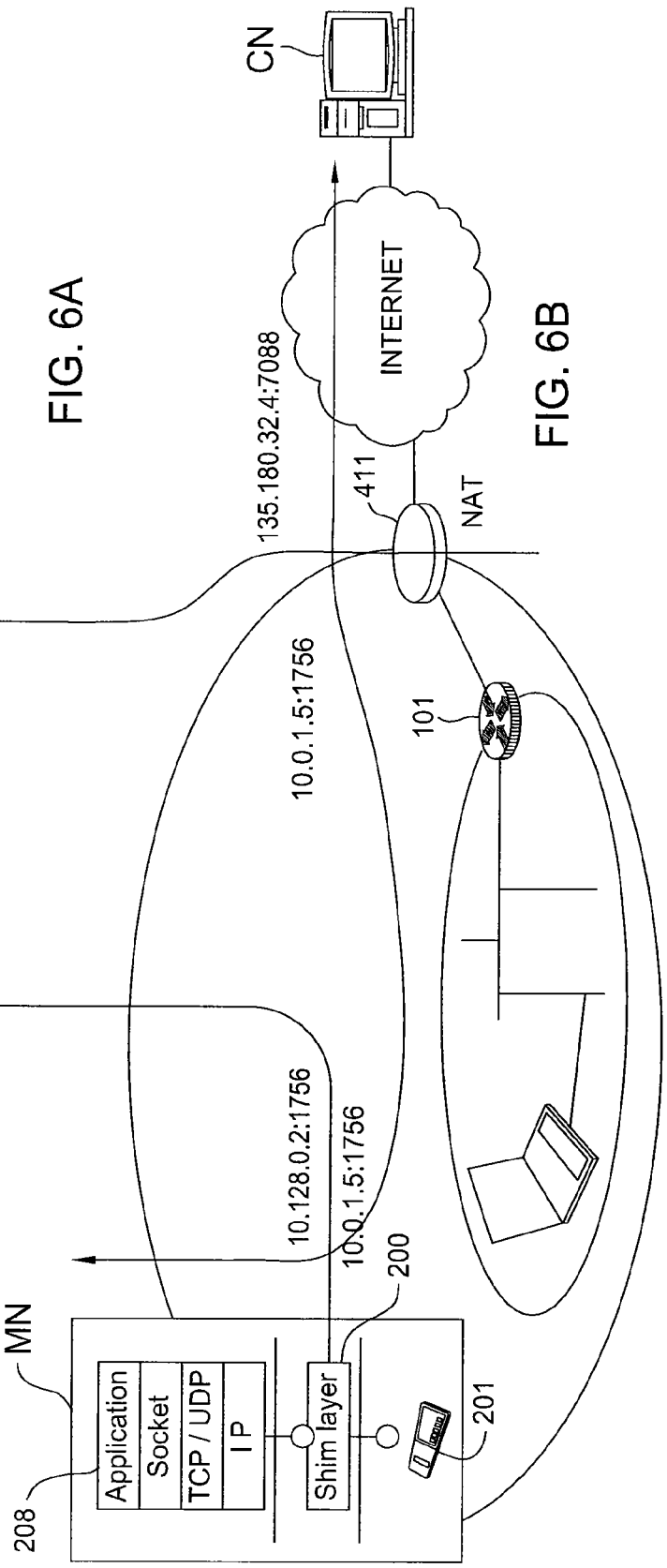

FIGS. 6A and 6B shows the address translation process for this example. FIG. 6A shows the source and destination addresses as seen by various nodes in the system. FIG. 6B shows the hardware devices and software processes corresponding to the nodes in FIG. 6A. When the application (e.g., a telnet client) 208 in MN sends a TCP message to the CN with IP 128.59.16.149, the TCP/IP stack uses the virtual IP of 10.128.0.2 as the source IP as shown in FIG. 6A. The shim layer 200 translates the source IP from virtual IP address (10.128.0.2) to actual IP address of 10.0.1.5 and sends it to the network interface driver 201. The packet reaches the NAT device 411, where it picks up a new external (public) IP address of 135.180.32.4 and port 7088, from it range of external IP and port, for this new connection. The packet processing rule at the NAT 411 maps the tuple [TCP, 10.0.1.5, 128.59.16.149, 1756, 80] to [TCP, 135.180.32.4, 128.59.16.149, 7088, 80] in the outgoing direction and the reverse in the incoming direction. Similarly the destination IP in packets from CN to MN is changed from 135.180.32.4 to 10.0.1.5 and port from 7088 to 1756 at the NAT device 411. The shim layer 200 in the MN further changes the destination IP from actual IP address 10.0.1.5 to virtual IP address 10.128.0.2 and gives it to the TCP/IP stack 202, 204.

Figure 7:
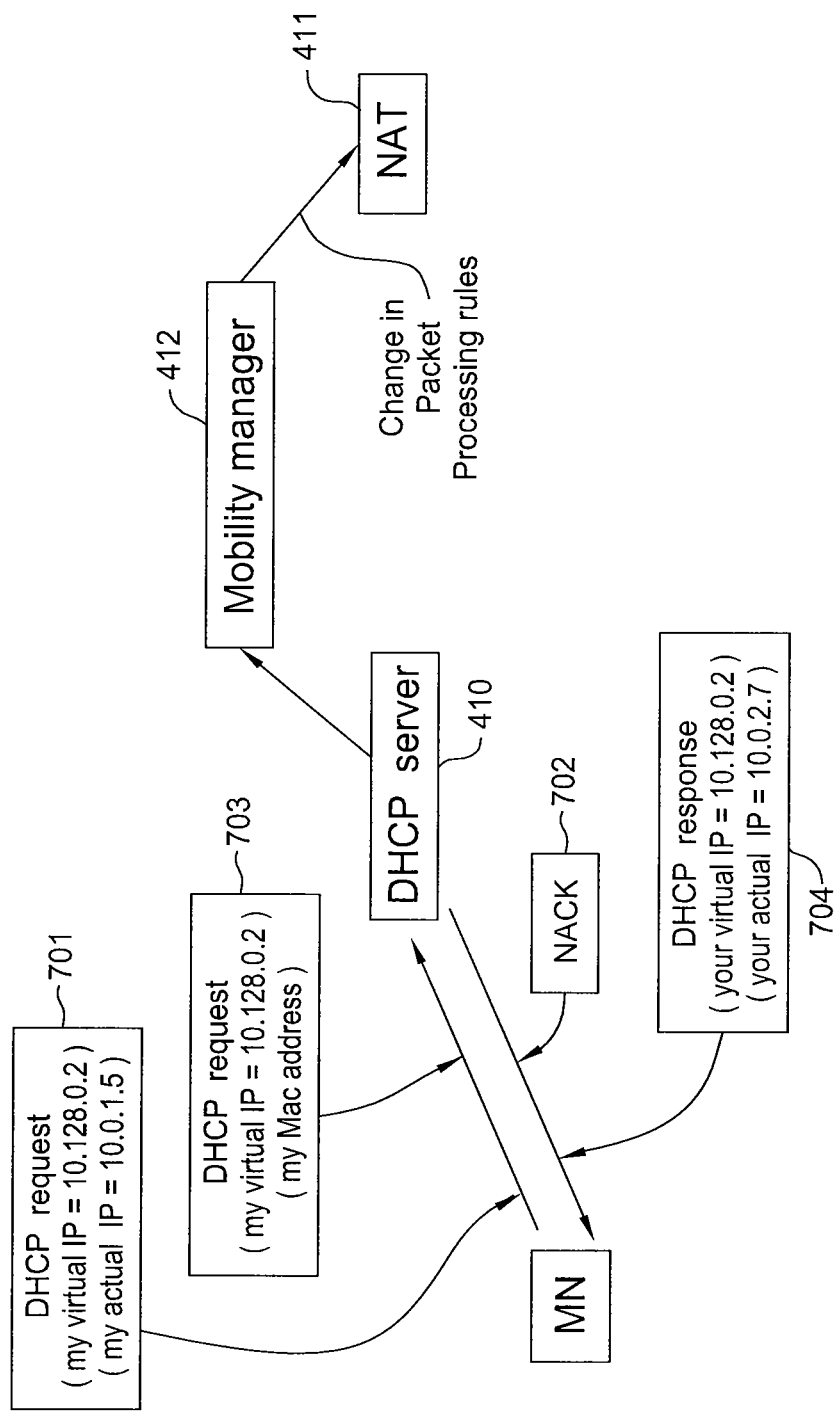
FIG. 7 shows the DHCP protocol messages used when the mobile node moves from a first subnet to a second subnet.

FIG. 7 gives the DHCP exchange when the MN moves to a new subnet. MN sends a DHCP REQUEST 701 with shim layer address option containing the old virtual IP of 10.128.0.2 and requested IP of old actual IP 10.0.1.5. Since the DHCP server 410 discovers that the MN's relay is not in the same subnet as 10.0.1.5, but is in the subnet 10.0.2.x, it can not allocate the same actual IP of 10.0.1.5. So the DHCP server sends a NACK 702 to the MN. The MN now sends a DISCOVER message 703 with the shim layer address option containing 10.128.0.2 and no requested IP. Now the DHCP server 410 allocates a new actual IP of 10.0.2.7 in the new subnet, and sends a response 704 to MN. It also informs the MM 412 about the change in the virtual to actual IP mapping so that the MM can change the NAT packet processing rules. All occurrences of old actual IP is changed to the new actual IP in the NAT packet processing tables.

FIGS. 8A and 8B show the various addresses seen by the various nodes after MN has moved to a second subnet. Now the shim layer 200 changes the source IP to the new actual IP of 10.0.2.7 for outgoing packets. The source IP is changed to the same old external IP 135.180.32.4 and port 7088 at the NAT 411. A close comparison between FIGS. 6A and 8A shows that the only change is in the actual IP address. Since the change in actual IP address from 10.0.1.5 to 10.0.2.7 is visible only in the NAT domain between the shim layer 200 and the NAT 411, and is transparent to the TCP/IP stack 202, 204 and the CN, the connections are preserved.

Figure 9:
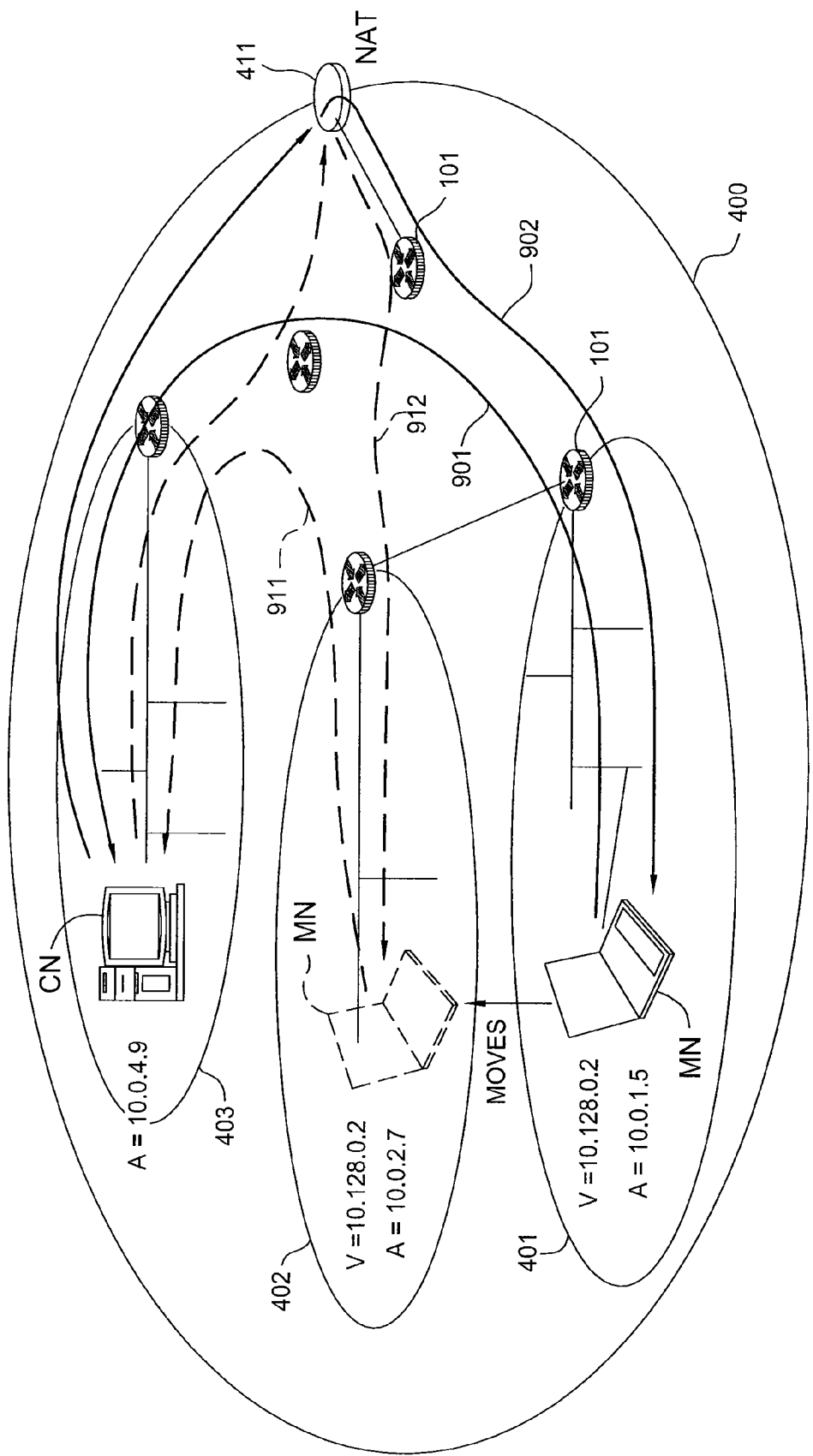
FIG. 9 shows intra-domain sessions continuing after the mobile node moves to the second subnet.

FIG. 9 shows intra-domain sessions when a node MN moves from one subnet 401 to another subnet 402. For an existing session between the MN (in subnet 401) and the CN, the NAT 411 applies the source address translation (SNAT) from actual IP to virtual IP, and the destination address translation (DNAT) from virtual IP to actual IP. When the MN sends packets to CN, the packets follow route 901 directly to the CN at IP address 10.0.4.9 without going through the NAT 411. When the CN sends packets to the MN, to virtual IP 10.128.0.2, the packet follows route 902 to reach the NAT device 411, which translates the destination from virtual 10.128.0.2 to actual 10.0.1.5. Note that all the virtual IP addresses are routable to the NAT device 411 within the domain.

When the MN moves to a new subnet 402 and gets a new actual IP 10.0.2.7, both the SNAT and DNAT tables are updates to reflect the new actual IP address. The packets from the MN to CN still go directly by route 911, but packets from CN to the new actual IP 10.0.2.7 of the MN follow route 902, in which they are forwarded by the NAT 411.

Although the example shows that the CN is stationary, the scheme works even if CN is also mobile. Consider another mobile node MN2 (not shown) with actual IP address as 10.10.1.2 and virtual IP as 10.128.0.3, talking to first MN (say MN1, not shown). An application on MN1 sends the packet with destination IP 10.128.0.3 and source 10.128.0.2. The shim layer 200 translates the source to actual 10.0.1.5. NAT 411 intercepts the packet, changes the destination address from virtual 10.128.0.3 to actual 10.10.1.2. It also changes the source address from actual 10.0.1.5 to virtual 10.128.0.2. The packet is forwarded to MN2 with source 10.128.0.2 and destination 10.10.1.2. The shim layer 200 of MN2 further translates the destination from actual 10.10.1.2 to virtual 10.128.0.3. Both the applications on MN1 and MN2 think that the connection is established between the virtual addresses 10.128.0.2 and 10.128.0.3. Now if either MN1 or MN2 moves to a new actual IP address, the packets can still be delivered through NAT 411, by mapping the virtual IP to actual IP.

In some embodiments, optimization may be performed when both the end-points have MobileNAT implementations, so that the packets can be exchanged directly between the two endpoints instead of going through the NAT 411.

Figure 10:
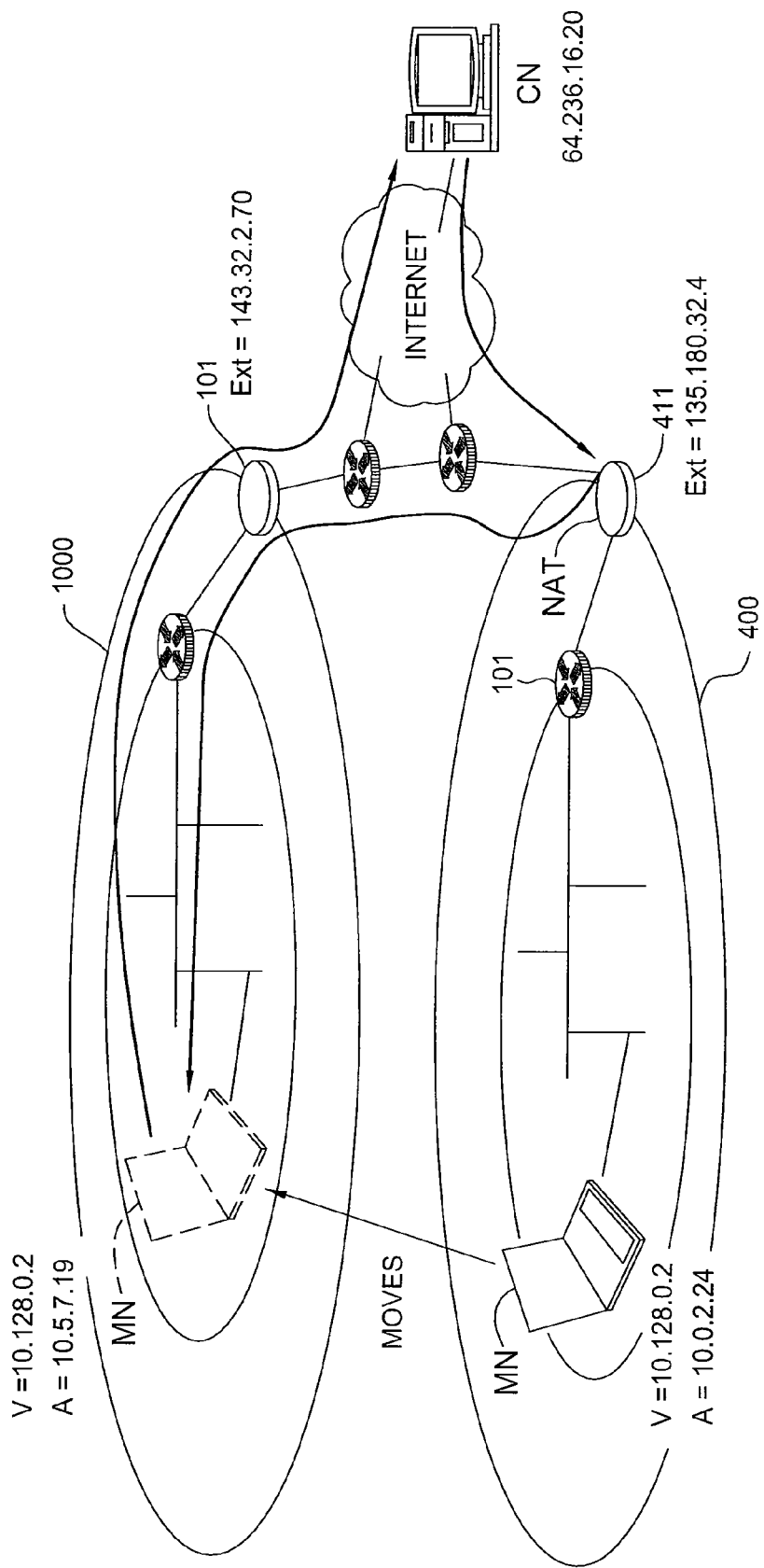
FIG. 10 shows a sessions with a public domain corresponding node continuing after the mobile node moves to a second NAT domain.

FIG. 10 shows an exemplary network in which the mobile node MN (with actual IP 10.0.2.24 and virtual IP 10.128.0.2) moves from one NAT domain 400 (with external IP 135.180.32.4) to another NAT domain 1000 (with external IP 143.32.2.70) and acquires a new actual IP address of 10.5.7.19. The TCP connection is with the CN 64.236.16.20 at port 80. Since the CN still thinks that it is connected to the old IP 135.180.32.4, the system signals the old NAT 411 (referred to as Home NAT for the mobile node) to forward the packets to the external IP address of the new NAT 1011 (this is called the Visited NAT). The new NAT 1011 is signaled to forward the packet on this external IP and port to the internal mobile node at its actual IP address. Again, the choice of either tunneling or translation between the two NATs 411 or 1011 is possible. Since the NATs 411, 1011 are expected to be on high-speed wireline network, the bandwidth overhead of tunneling is not really an issue. However, tunneling reduces the number of external IP addresses needed for this migrated connections, as all connections can share the same IP address.

There is a problem if another node (MN2 not shown) in the new domain 1000 has the same virtual IP address 10.128.0.2 as this mobile node MN. In this case, the mobile node MN will not be able to connect to the other node MN2 with same virtual address unless mobile node MN changes it virtual address (at least for connections in the NAT domain 1000 where MN2 is located).

When the node MN moves to a new NAT domain 1000, it notifies the new DHCP server (not shown) that its old virtual IP address was 10.128.0.2 and the old mobility manager (MM) 412 associated with old NAT 411 was 135.180.32.4. If the new DHCP server, after authentication, find out that the virtual address 10.128.0.2 is used by another node MN2, then the new DHCP server allocates a new unused virtual address (e.g., 10.128.0.5). The new MM queries the old MM 412 about the existing connections and updates the mapping tables in the home and visited NATs 411 and 1011, respectively.

The mobile node MN keeps using the old virtual address 10.128.0.2 for the old connections, and uses the new virtual address 10.128.0.5 for the new connections. The node MN sets the new virtual IP address as the more preferred virtual IP address. Unless the MN closes all the old sessions, it can not release the old virtual IP address 10.128.0.2. Until then, MN cannot establish new connection to the other node MN2 in the network with the same virtual IP address 10.128.0.2. However MN can still establish connections to other nodes with different IP addresses using its more preferred new virtual IP address 10.128.0.5. If the node's OS is not capable of assigning two virtual IP addresses to the same interface, the shim layer 200 tries to expose another virtual adaptor with the new virtual IP address 10.128.0.5. If this also fails, then it gives a choice to the user to (1) continue with the old sessions, and not establish new sessions, or (2) close all the existing sessions and start afresh. When the shim layer 200 detects that all the sessions are closed it automatically removes the old virtual IP mappings and uses the new IP for all purposes. However, this involves additional connection tracking overhead in the shim layer 200. In some embodiments, to avoid the overhead, the shim layer 200 can always prompt the user to make the decision when to start afresh with the new virtual IP address.

Note that the traffic from the visited NAT 1011 to the CN can be either direct, in which case the visited NAT fakes its source address as that of the home NAT 411, or it can be through the home NAT 411 (in either tunnel or translate mode).

When the MN moves to a third NAT domain (not shown), the old visited NAT 1011 becomes home NAT for some connections, whereas the old home NAT 411 remains home NAT for the old connections if they are still active. Long lived sessions, while the host moves across multiple NAT domains may result in many visited and home NATs for different connections. Local MMs may enforce a policy as to how long a node can use its NAT as home NAT after moving out of this domain. When the node returns back to the home NAT, the MM detects this and updates the existing connections mappings.

As long as the MN is using the old virtual IP of the Home NAT domain 400, it must refresh this address with the old DHCP server. Since, the old DHCP server is not accessible from the new NAT domain, the MN signals the mobility manager (MM) which in turn signals the DHCP server.

When the node MN moves to the new NAT domain 1000, the existing intra-domain sessions can also be preserved by altering the translation tables at the visited and home NATs 1011 and 411, respectively.

Figure 11:
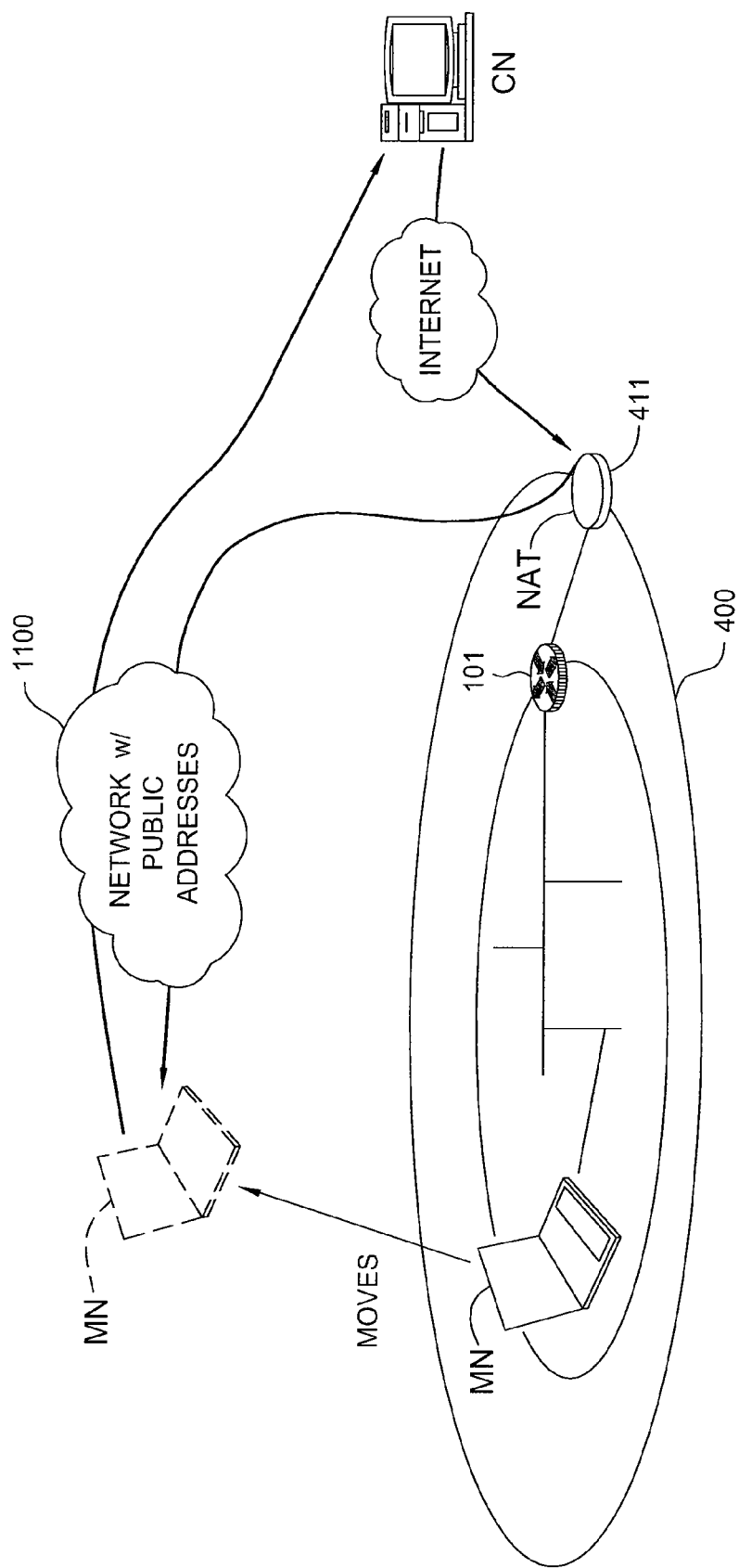
FIG. 11 shows a sessions with a public domain corresponding node continuing after the mobile node moves to a network with a public address space.

The scenario of a node MN moving from a private NAT domain 400 to a public address space 1100 is similar, as shown in FIG. 11. In tunnel mode, the operation is analogous to MobileIP with the home agent at the home NAT 411, and the co-located foreign agent at the mobile node MN. Since there is no visited NAT in public address space 1100, the shim layer 200 of MN does the translation on a per-connection basis. Moreover, in the absence of a new MM 412, the shim layer 200 also does additional authentication with the old MM for updating the home NAT tables. To simplify the shim layer implementation, some embodiments do not to support this kind of mobility, and instead terminate existing sessions.

When a node that is already in a public address space (presumably using Mobile IP with a global home address), moves to the NAT domain, that node can use the existing IP-in-UDP tunnel approach. This technique does not use the capabilities of MobileNAT. However, if the node's home agent is co-located with the NAT 411, then it may choose to switch from the Mobile IP mode to MobileNAT mode.

Exemplary Implementation of MobileNAT

This section describes the design and implementation details of an exemplary MobileNAT implementation using Windows XP client and a Linux NAT box. This example supports connection migration of an active TCP telnet session with an external public corresponding node when the internal private mobile node moves from one subnet to another in the same NAT domain.

Figure 13:
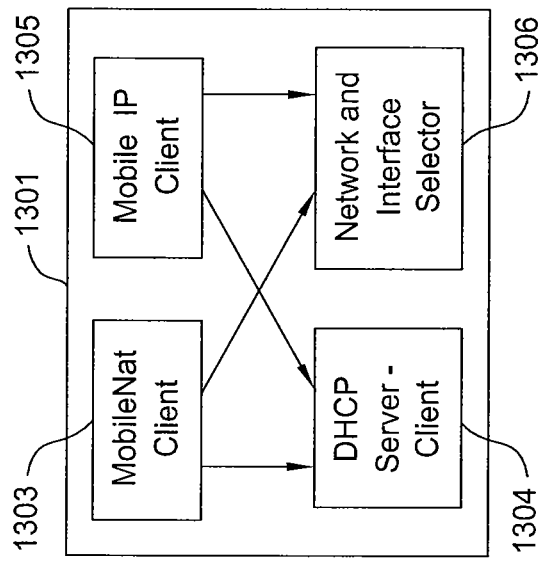
FIG. 13 shows a variation of the client of FIG. 12.
Figure 12:
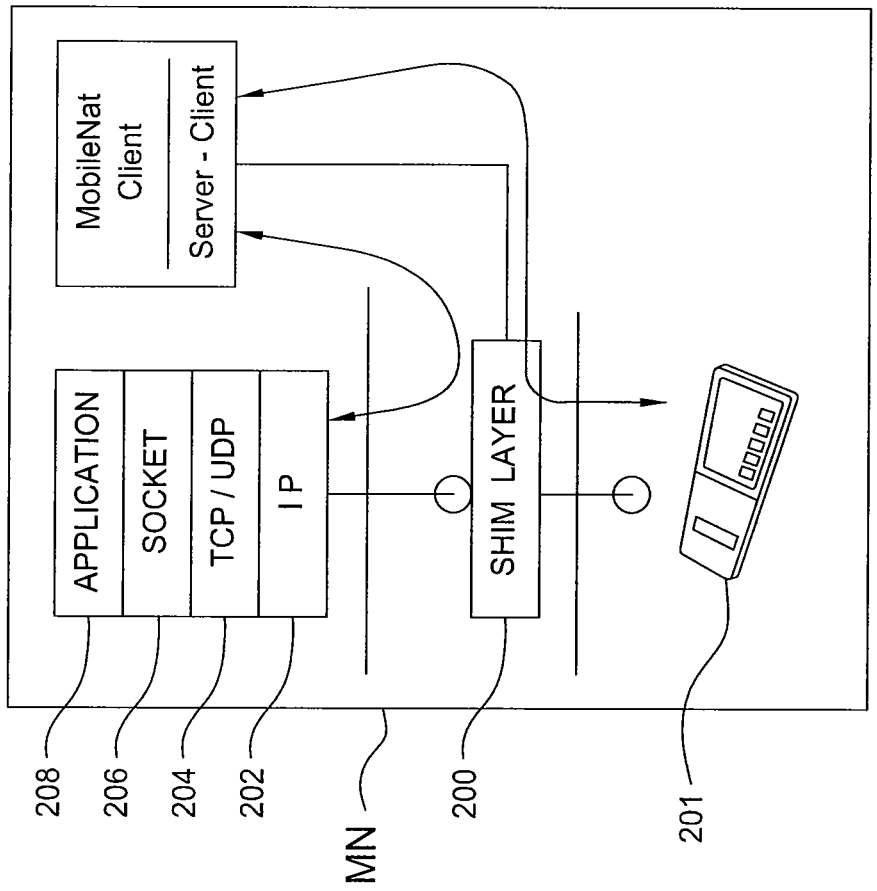
FIG. 12 shows an exemplary implementation of the mobile node of FIG. 1.
Figure 14:
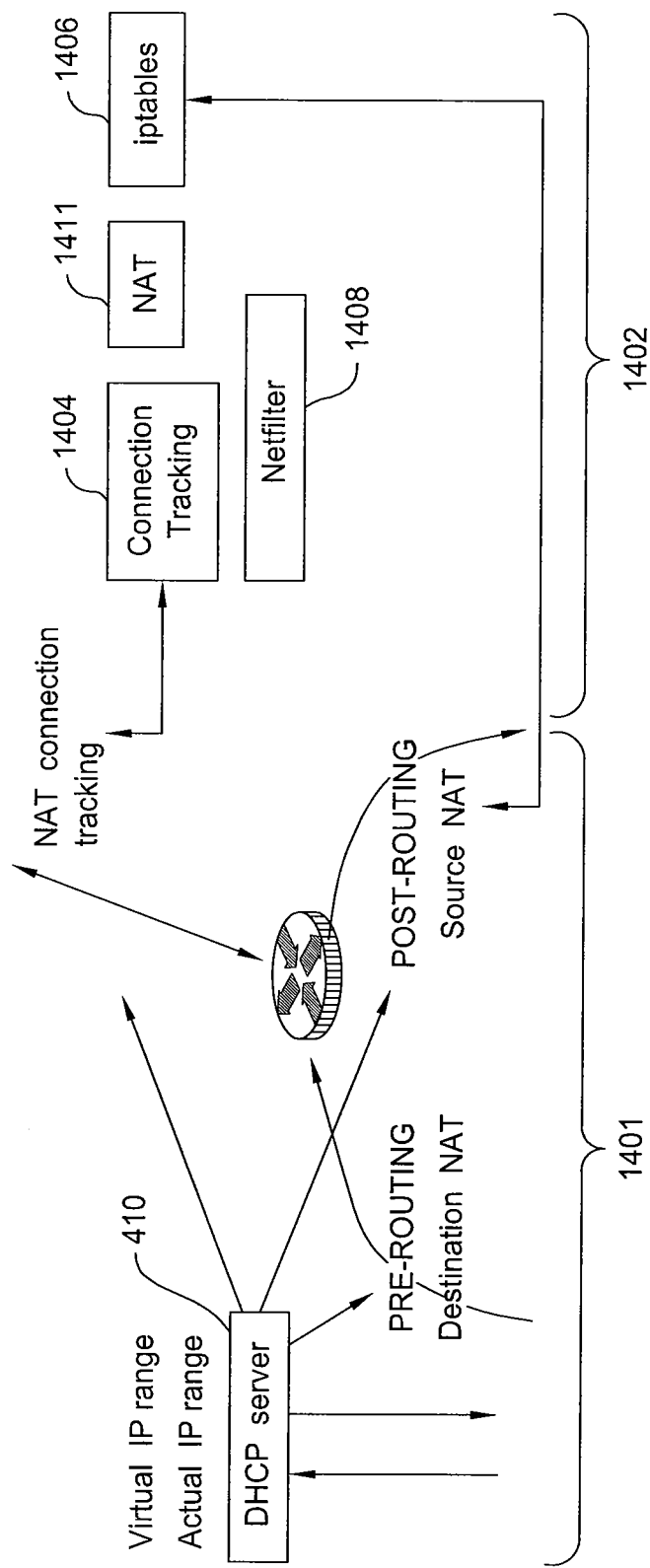
FIG. 14 shows an exemplary implementation of the DHCP server and NAT.

There are two main components as shown in FIGS. 12-14:

Client: One exemplary client side implementation shown in FIG. 12 is divided into two parts: the driver layer (called the shim-layer) 200 that sits between the TCP/IP stack 202, 204 and the network interface 201, and the application level processing (called mnatc client) 1201 that processes application level DHCP client messages and interacts with the shim-layer using ioctl calls.

A unified mobility client implementation is shown in FIG. 13. The MobileNAT Client 1303 and DHCP server client 1304 are provided, similar to those in FIG. 12. In addition, a Mobile IP client 1304 and a network interface selector 1305 are included.

Server Side Components

Linux NAT and Connection Tracking

Server: FIG. 14 shows the server (NAT) side implementation divided into two parts 1401 and 1402. Portion 1401 includes the DHCP server application 410 that allocates the virtual and actual IP addresses and calls the Linux netfilter modules 1408 to change the NAT tables 1406. In portion 1402, the new setsockopt option allows changing the IP address of the existing connections in the Linux connection tracking module 14-4.

The example uses the netfilter 1408, iptables 1406, ip_conntrack 1404 and ip_nat modules 1411 in the Red-hat Linux kernel 2.4.18 for NAT functions. The netfilter module 1408 provides a generic framework for any filtering and translation of IP packets for router or host. There are various stages in the routing path where the processing hooks can be applied. In particular, for routers, the pre-routing stage can have destination address translation (DNAT) and the post-routing stage can have the source address translation (SNAT). Moreover, standard NAT functionality of mapping internal private IP and port to external public IP and port is implemented using the NAT masquerade table in the post routing stage for packet going to the external interface. A connection tracking table maintains the ongoing active or pending connections such that, with the mapping specified in one direction, the reverse mapping is automatically established when the connection is established. For instance, when the private node makes a TCP connection to an external public host, the masquerade table picks up an available external IP and port for the connection and creates the connection tracking entry (internal datastructure in the memory). When the reply comes from the public host, the connection tracking entry makes sure that the packet goes to the appropriate internal private node.

The various tables like SNAT, DNAT and MASQUERADE can be specified using the iptables command. The iptables module 1406 (that is a replacement for the old ipchains module) maintains all these tables. The ip_conntrack 1404 and ip_nat 1411 modules are hooked into the netfilter framework. For every packet, these modules are invoked. The first packet in a session is processed by the ip_nat module 1411, that looks up into the various iptables tables 1406, translates the IP address, and creates a connection tracking mapping. All subsequent packets in the session are applied the same address translation.

Iptables can help specify the initial translation mechanism. For example, one can specify to pick a IP in range 135.180.32.1-135.180.32.7 and port 8000-10000 for outgoing connections in the MASQUERADE table. However, the exact IP address and port picked up by the ip_nat module 1411 for a connection is stored internally in memory by the ip_conntrack 1404 and ip_nat 1411 modules. To change the actual IP address in the connection tracking, a new setsockopt option is provided. The iptables command is not sufficient for this purpose. The connection tracking module 1404 maintains a hash-table of all the connections in each direction. The hash table has information about the source/destination IP and port and the protocol. The forward direction structure is linked to the reverse direction. The connection structure also has protocol specific information (port number) and information about other modules like NAT and FTP helper. The hash is computed using the source/destination IP/port and protocol. When the actual IP is changed, the hash for the connection changes, hence it is removed from the old slot in the hash-table and moved to the new slot. The same is true for the internal hash tables in the NAT and FTP modules. In one exemplary implementation, the connection tracking module 1404 invokes a call back from the NAT module 1411 when such change in IP address happens.

A new option SO_REPLACE_NAT_IP as shown in the code below. This implementation changes the connection structure for forward and reverse connections in the conntrack module 1404. It also changes the connection hash in ip_conntrack 1404 and ip_nat 1411 modules. The implementation resides in the ip_conntrack module 1404. The ip_nat module 1411 plugs in a call back in to the ip_conntrack module 1404, that gets invoked when setsockopt is called. This callback function changes the hash in the ip_nat module 1411, since those data-structures are not directly accessible from the ip_conntrack module 1404. Since the ip_conntrack module 1404 is loaded before the ip_nat module 1411, this scheme works. Alternatively, one can provide many setsockopt commands, one in each module to update the IP address. In the first scheme, the call back is plugged in from other modules like FTP that maintain their own hash-table with hash consisting of the IP address.

```
#define SO_REPLACE_NAT_IP 80
typedef struct replacenatip
{
struct in_addr old; /* Old IP address */
struct in_addr new; /* New IP address */
} replacenatip;
s=socket(...); /* RAW socket */
struct replacenatip map;
map.old = inet_addr("10.0.1.5"); /* old actual IP */
map.new = inet_addr("10.0.2.7"); /* new actual IP */
setsockopt(s, SO_REPLACE_NAT_IP, &map);
```

In Linux NAT, SNAT can be applied only in post-routing (and not in pre-routing) and DNAT can be applied only in pre-routing (and not in post-routing) stages. This means, for intra-domain sessions, the destination is converted from virtual to actual IP before a routing decision is made, and then after the routing decision is made, the source converted from actual to virtual. This causes a problem with the application level helper function, like FTP module in Linux NAT. The FTP helper module traps the signaling messages, opens the appropriate ports and creates the association with the old connection. For example, consider a node with private address 10.0.1.5 does an FTP transfer to external host 128.59.16.149, and the NAT has allocated the external IP of 135.180.32.4 and port 7088 for this connection. When the node sends an FTP command to download a file, the FTP module in the NAT 411 traps the message and changes the source IP and port to that of the external IP and a chosen port.

Now the FTP server sends the data packets to this new port of NAT 411. The NAT 411 in turn forwards the packet to the actual IP and port from the initial signaling message of the private node. Now if the actual IP changes from 10.0.1.5 to 10.0.2.7 the FTP module does not know about this change and the old association for the data traffic breaks.

In general, NAT causes a problem for any protocol that uses the IP address in the signaling messages, e.g., FTP, RTSP and SIP, because the signaling messages generated by the private node contain the private IP address in the messages, whereas the external public host expects a public address. Linux NAT provides hooks to plug in helper modules (e.g., FTP helper module) to examine the signaling message and alter future IP datagrams related to this signaling session. However, with MobileNAT, the FTP module also breaks, since the association is maintained with respect to the actual IP rather than the virtual IP. Linux NAT does not allow SNAT in the pre-routing stage so the actual source IP is not changed to the virtual source IP before the FTP module is invoked. An alternative approach is to use two different NATs. An internal NAT changes the virtual IP to actual IP and vice-versa, and the external NAT applies the standard masquerade table for the virtual IP to external IP and port for the connection. However, this involves more processing as the translation needs to be done twice. In other embodiments, the FTP and other helper modules may be enhanced to also provide setsockopt to change the IP from old to new.

DHCP Server

Figure 15:
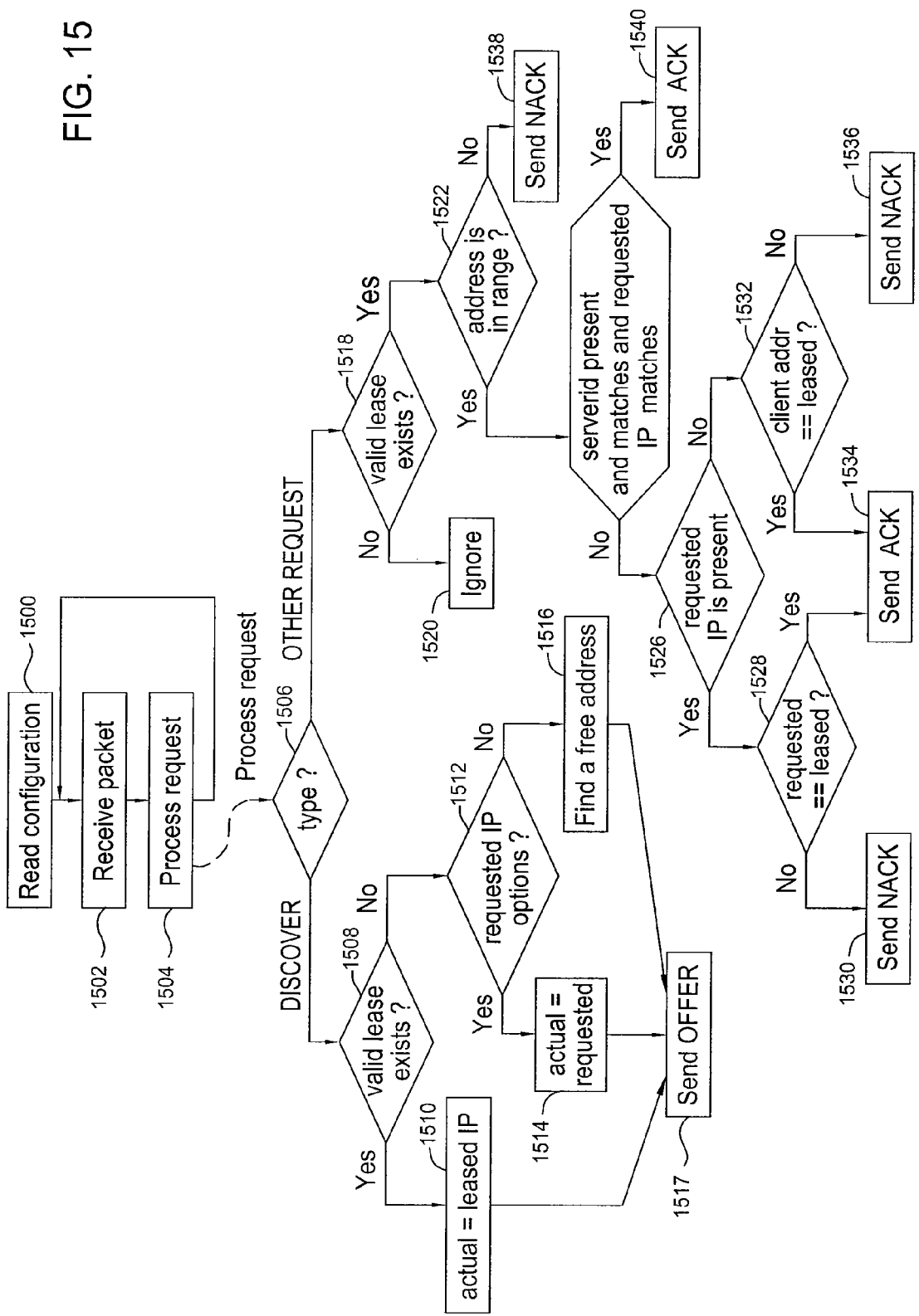
FIG. 15 is a flow chart diagram of the DHCP server processing.

The udhcp DHCP server is enhanced to support MobileNAT. The modifications for virtual IP address affects only MobileNAT hosts, and the server can still be used to allocate IP addresses to non-MobileNAT hosts. FIG. 15 is a flow-chart for processing at the DHCP server 410. The server 410 maintains a range of virtual IP addresses and set of ranges for actual IP addresses for different subnets.

At step 1500, the DHCP server 410 reads the configuration of the NAT domain, including the DHCP relays included therein.

At step 1502, the server 410 receives a packet, which may be from a mobile node previously assigned virtual and/or actual IP addresses, or from a newly activated mobile node that has not been assigned a virtual or actual IP address.

At step 1504, the server 410 processes the request. Steps 1500 to 1504 are repeated for each packet.

The details of processing a packet are shown by steps 1506-1540.

At step 1506, the server 410 determines the type of message. If the client indicates that it does not yet have a virtual IP address (by providing a virtual IP address of 0.0.0.0 in the options), step 1508 is executed. Step 1508 is always the path selected if the mobile node sends a DISCOVER message. If the packet is a REQUEST message, step 1518 is executed.

At step 1508, the server 410 determines whether the mobile node has a valid lease on the pertinent actual IP address.

If the mobile node has a valid lease for a given actual IP address, then at step 1510, server 410 assigns the leased IP address as the actual IP address. Then step 1517 is executed.

If (at step 1508) there is no valid lease, then step 1512 is executed. At step 1512, the IP options requested in the DISCOVER message are examined. The mobile node provides its MAC address to the server 410.

At step 1514, if an IP address is requested, then the requested actual IP address is assigned to the mobile node. Then step 1517 is executed.

At step 1516, if no IP address is specified in the DISCOVER message, then server 410 finds a free address. Then step 1517 is executed.

At step 1517, the server 410 sends an OFFER message to the mobile node, inviting the mobile node to contact the server further.

If the message type is REQUEST, then at step 1518, server 410 determines whether the mobile node has a valid lease. If not, then at step 1520, the REQUEST is ignored.

If a valid lease exists at step 1518, then at step 1522, the server 410 determines whether the requested actual IP address is within the allowable range for the subnet in which the mobile node is currently located (determined by the location of the access point used). If not, then at step 1538, server 410 sends a NACK to mobile node MN. In response to the NACK, the mobile node will send a new request, including its previously assigned virtual IP address and its MAC address (in place of an actual IP address).

If, at step 1522, the actual IP address of the mobile node is within the allowable range for the subnet in which the mobile node is currently located, then step 1524 is executed. At step 1524, server 410 determines whether a matching serverid is present in the configuration parameters and the requested IP matches. If the answer is "yes," then at step 1540, server 410 sends an ACK to the mobile node. This indicates that the mobile node can continue to use the requested virtual and actual IP addresses.

If, at step 1524, either the serverid is absent or not matching, or the requested IP does not match, then step 1526 is executed. At step 1526, a determination is made whether a requested IP is present in the IP options.

If there is a requested IP, step 1528 is executed. At step 1528, a determination is made whether the requested IP equals the IP leased by this mobile node. If the answer is "yes," then server 410 sends an ACK to the mobile node, renewing the lease on the requested IP addresses.

If the requested IP does not equal the IP leased by this mobile node, then step 1530 is executed, by sending a NACK to the mobile node. In response to the NACK, the mobile node will send a new request, including its previously assigned virtual IP address and its MAC address (in place of an actual IP address).

For the case where the requested IP is not present, at step 1532, if the client address equals the leased address, then step 1534 is executed by sending an ACK.

For the case where the requested IP is not present, at step 1532, if the client address does not equal the leased address, then step 1536 is executed by sending a NACK.

Note that a new IP address is allocated in response to a DISCOVER message, whereas the existing allocated IP is returned in response to a REQUEST message.

The virtual IP address is returned in the Shim layer address option in both OFFER and ACK only if the corresponding request had a Shim layer address option. The actual IP address is allocated based on the sub-net of the relay agent.

Once virtual and actual IP are allocated for a host, the DHCP server updates the SNAT and DNAT tables in NAT to map the actual source IP to virtual source IP and the virtual destination IP to the actual destination IP for the packets coming in and going out on internal interface respectively. Note that SNAT and DNAT are not applied for the connection from internal private node to external public node. These are used only for intra-domain sessions.

If the DHCP server detects that the actual IP was changed for a give virtual IP for a node, then it also updates the connection tracking module with setsockopt command to change the internal hash-table for the connection.

Mobility Manager

The mobility manager 412 does the following things:

Receives notification about actual and virtual IP address allocation from DHCP server 410.

Update NAT packet processing rules using the Midcom framework.

Listen to administrative commands from other MM in other NAT domains for connection list, or change in IP address.

Inform the DHCP server 410 to renew a given virtual IP address for a node which has left this domain.

In one exemplary embodiment, the MM is part of the DHCP server and has only limited functionality. In other embodiments, the MM may be implemented in a standalone hardware or software component.

Client Side Components

Driver Functions

The Network Driver Interface Specification (NDIS) is a set of standards developed by Microsoft and 3COM for network drivers that enables (1) communication between a Network Interface Card (NIC) and a protocol (such as TCP/IP or Net-BIOS), and (2) use of multiple protocols on the same network. The Windows OS supports several types of kernel-mode network drivers. For instance, a miniport driver directly manages a network interface card (NIC) and provides an interface to higher-level drivers. An intermediate driver interfaces between upper-level protocol drivers, such as a legacy transport driver, and a miniport driver. A typical reason to develop an intermediate protocol driver is to perform media translation between an existing legacy transport driver and a miniport driver that manages a NIC for a new media type unknown to the transport driver. An upper-level protocol driver implements a transport driver interface (TDI) or an application-specific interface, at its upper edge to provide services to users of the network. At its lower edge, a protocol driver provides a protocol interface to pass packets to and receive incoming packets from the next-lower driver. In addition, there can be a filter-hook driver to extend the functionality of the IP filter driver in the OS.

Figure 16:
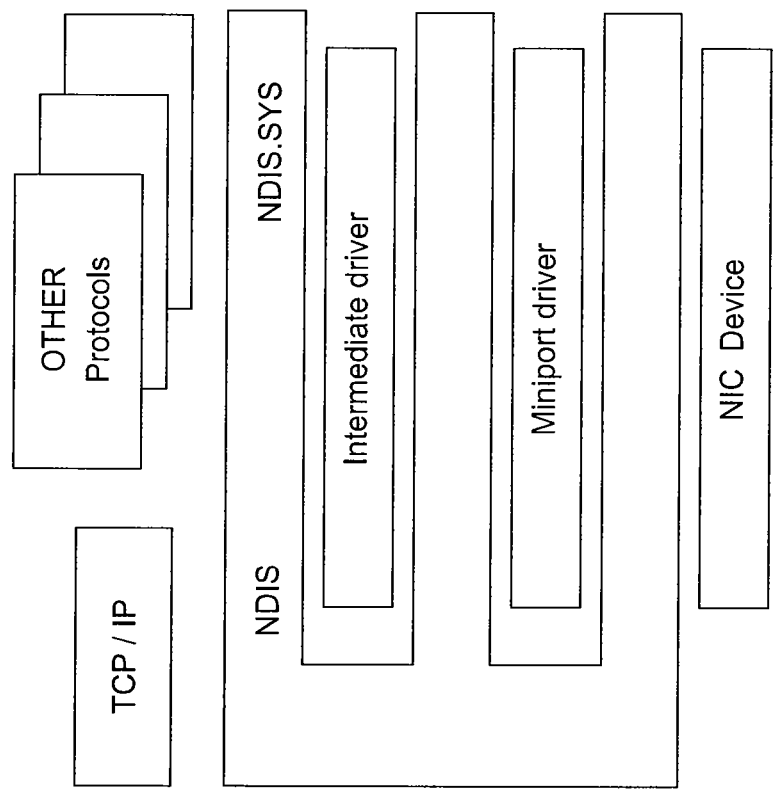
FIG. 16 is a diagram of an exemplary driver architecture.

In one embodiment, a new intermediate driver exposes itself as a miniport driver to the protocol level and a protocol driver to the miniport level drivers. The relationships between miniport drivers, protocol drivers, intermediate drivers and NDIS are illustrated in FIG. 16.

One problem with the Windows network driver implementation is that the TCP/IP and bunch of other protocols like ARP, DHCP, ICMP, etc., are combined into a single black-box called the TCPIP.sys driver. Since the application developer and driver developers do not have control over the intermediate functionality of the different layers like TCP and IP, or different protocols like DHCP and ICMP, much functionality is duplicated in the intermediate driver, to handle the DHCP, ARP, and re-computation of check-sum when an IP address changes from actual to virtual and vice-versa.

In one embodiment, the shim-layer 200 is implemented as an intermediate driver. It forwards all the DHCP messages to the external MobileNAT client. Shim layer 200 gets notification of its actual IP, virtual IP, subnet mask and gateway IP from this MobileNAT client 1201. Once the shim layer 200 gets its gateway IP, it initiates an outgoing ARP request for this gateway IP to get the MAC address of the gateway. The MobileNAT client 1201 is responsible for sending the DHCP responses to the client DHCP requests from TCP/IP layer 202, 204. It also does the actual DHCP client transactions with the external DHCP server 410 to get the actual IP, virtual IP, subnet mask, gateway IP and other configuration parameters.

The intermediate driver, called the Passthru driver is modified from the Windows DDK example driver. Essentially the driver examines all the messages going in either direction. If the packet contains a DHCP message, than the packet is forwarded to the registered client application. The driver allows registering client applications as message consumers. A DHCP message is essentially a UDP message with source port 68 and destination port 67 for outgoing direction, and source port 67 and destination port 68 for the incoming direction. The DHCP standard client port is 68 and server port is 67.

The driver also provides a new ioctl command to set the mode to one of MOBILE_IP_HOME, MOBILE_IP_FOREIGN, MOBILE_NAT_TRANSLATE and PASSTHRU. In the PASSTHRU mode the driver acts as a passthru module without modifying any packet. The other modes allow a single driver to be used in the MobileIP and MOBILENAT clients. Other ioctl commands are used in MOBILENAT mode to set the virtual IP, actual IP, gateway IP and subnet mask.

In the MOBILE_NAT_TRANSLATE mode the packet is processing in the outgoing direction in virtual-miniport as follows:

```
if the ethernet type is IP
    if the IP protocol type is UDP
        if the source port is 68 and destination port is 67
            if there is any registered message consumer
                forward the packet to the consumer
            else
                pass the packet normally
    if the source IP is virtual IP
        change the source IP to actual IP
        recompute the IP checksum
        recompute the UDP or TCP checksum as appropriate
    if the destination IP is not in the same subnet
    as the actual IP and the destination IP is
    not the broadcast IP
        change the destination MAC to that of the
        default gateway
else if the ethernet type is ARP
    if the direction is outgoing request
        if the ARP is done for default gateway IP
            indicate the cached gateway MAC to higher layer
            initiate a new ARP for the gateway IP
        else if the ARP is done for an IP that is not
        in the local subnet
            indicate the cached gateway MAC
        else
            pass the ARP request to lower miniport
    else if the direction is outgoing response
        drop the request
```

The incoming packet is processed in virtual-protocol layer as follows:

```
if the ethernet type is IP
    if the IP protocol type is UDP
        if the source port is 67 and the destination port is 68
            if a message consumer is registered
                forward the DHCP packet to the consumer
            else
                pass the DHCP message to the higher protocol layer
        if the destination IP is actual IP
            change the destination IP to virtual IP
            recompute IP checksum
```

```
        recompute the UDP or TCP checksum as appropriate
else if the ethernet type is ARP
    if the direction is incoming ARP request
        if the target IP is actual IP
            respond with the local MAC address
        else
            drop the request
    else if the direction is incoming ARP response
        if the target IP is actual IP
            if the source IP is the gateway IP
                cache the gateway MAC address
            else if the target IP is virtual IP
                forward the response to higher protocol layer
```

One embodiment detects if the IP address is in the same subnet as the actual IP by masking the IP address and the actual IP address with the actual subnet mask. If the masked network part are same then the two IP addresses are in the same subnet.

The connection status indication (media disconnect or connect) from the miniport are blocked at the driver so that the higher TCP/IP layer never knows about the network disconnection.

MobileNAT Client

The MobileNAT client 1201 implements a DHCP client state machine as shown in R. Droms., "Dynamic host configuration protocol." RFC 2131, Internet Engineering Task Force, March 1997, which is incorporated by reference herein. However, to combat the huge DHCP latency the timer values are manipulated for faster response. The client, mnat-c.exe must be running on the mobile node for MobileNAT functionality. The client state machine is explained in the following pseudo-code.

```
If the message is from TCP/IP layer
    if the DHCP state is not active
        put the message as pending
    else
        respond to the request
else if the message if from miniport layer
    if the message is connect status
        perform DHCP client transactions again
    else if the message is a DHCP response
        trigger the event in the DHCP client state machine
If the DHCP client state is idle
    start the DHCP client state machine
At any time in the DHCP client state machine
    if the state becomes active
        respond to any pending message from TCP/IP layer
        store all the configuration parameters
```

The client 1201 responds with the virtual IP address to the TCP/IP layer in the DHCP response. The default gateway address is fixed as 10.0.0.1 and the subnet mask is 255.0.0.0. Other parameters, like DNS server IP address, domain name, server id, etc., are passed as they are received from the actual DHCP server.

In a way, the client 1201 implements a DHCP server to respond to the DHCP requests from the TCP/IP layer 202, 204, and a DHCP client to actually request the external DHCP server for configuration parameters. The response to the TCP/IP layer 202, 204 indicates that the virtual IP lease will never expire, whereas the client state machine takes care of renewing the actual IP lease from the external DHCP server 410 before it expires, transparent to the TCP/IP layer. Since the media disconnect indication is blocked in the shim layer 200, TCP/IP layer 202, 204 does not know about the media status and does not initiate any new DHCP translation when the cable is re-connected.

One embodiment 1301 (FIG. 13) separates the DHCP client and server functions 1304 from the MobileNAT client 1303 such that the client 1301 can be used by both MobileNAT 1303 and MobileIP 1305 clients as an integrated unified mobility client. The DHCP functionality is used in co-located Mobile IP mode. Secondly, the interface and network selector module 1306 allows selecting the appropriate interface (e.g., if the host has both 3G access and 802.11 access) and appropriate network (e.g., if the host is within range of two different access points, it can use the signal strength and/or user defined priority to determine which interface type and access point to choose). These modules enable a unified mobility client that can operate in Simple IP, Mobile IP or Mobile NAT modes as needed.

Security

Several security design issues are addressed below:

Mobile node is authorized to use the access point. This happens even before the first DHCP message is exchanged.

The DHCP messages exchanged between the mobile node and the DHCP server are authenticated. The timestamp is included in the signature to prevent replay attacks. This verifies to the DHCP server 410 that it is talking to the correct client, and to the client that it is talking to the correct server. DHCP authentication is used for this.

The DHCP server 410, Mobility manager 412 and NAT 411 are mutually trusted entities and provide secure communication among themselves.

The mobility managers 412 in different domains should use appropriate secure communication for signaling.

MobileNAT should work with IP security (IPSec). The AH (authentication header) mode is not possible with network address translator devices in the network, however the ESP (encapsulated security payload) should be allowed. IPsec is used in VPNs (virtual private networks).

MobileNAT should work with transport layer security (TLS) like secure socket layer (SSL).

The inter-domain mobility requires packet flow between two different NATs 411 in two different domains, i.e., the home NAT forwards the packets to the visited NAT. The system should provide an option to allow reverse tunneling from visited NAT to home NAT also such that the visited NAT does not have to spoof the source IP address.

The mobile nodes subscribed to an independent service provider with appropriate authentication, authorization and accounting (AAA) infrastructure should be allowed to roam in the MobileNAT domain.

In some embodiments, using a Mobile IP driver below IPsec provides additional advantages. Typically, when an MN is connected to a network IPsec software will establish a tunnel between the MN and the IPsec gateway that is sitting in some enterprise network. The examples described above enable moving the tunnel (when the MN moves its local attachment). Thus, in addition to mobile IP's general support for moving between networks, the examples allow the tunnel sitting on top to actually moves along with the Mobile IP client movement.

When the MN moves from one network to another, locally, whatever the gateway IPsec remembers would be wrong. In the example, by putting in the Mobility client driver below IPsec, a dummy IP address and a dummy MAC address are provided to the gateway, and then the IPsec client driver remembers that to always be the same. Thus, the IPsec client driver already thinks that it is attached to the same gateway even though underneath the interfaces are changing, and the networks are changing.

In one exemplary implementation, the IPsec client driver inquires about the gateway using ARP by sending a packet down to the network. The inquiry is intercepted, and a MAC address is provided in return, without sending the inquiry out into the network.

Optimizations, Extensions and Limitations

A number of other issues like scalability, security, paging, fast-handoff and deployment issues are addressed for a complete mobility solution.

Extensions

Route optimization for intra-domain sessions: All packets to the virtual address of MN goes to the NAT devices 411 before getting routed to the actual address of the MN. If an MN (MN1) is talking to another MN (MN2) in the same NAT domain, then the routing path can be optimized by sending packets directly between the two nodes. However MN1 needs to detect that the other side MN2 is also a MobileNAT client in the same domain and indicate to it the actual IP address, such that the packets by other side MN2 can be sent directly to the actual IP address of MN1. When MN1 moves, the other side MN2 will detect the ICMP host unreachable error and will start sending the packets to the virtual IP (to the NAT 411) again. This requires additional signaling to convey the actual IP of the other end point. There are two options: define a signaling between the two MNs or define a signaling from the NAT/MM to the MN. Either approach should allow secure (authenticated and authorized) signaling.

Co-existence with Mobile IP and Hawaii: If a mobile node MN uses Mobile IP instead of MobileNAT it can still roam in the NAT domain. The only difference is that it does not have a virtual IP address. Other IP based micro-mobility mechanisms (like Hawaii or heirarchical Mobile IP) can also co-exist with the MobileNAT scheme.

Co-existence with other IP clients that are not mobile: A non-mobile client using IP can also exist in the NAT domain.

Embodiments using parts of other existing protocols: Parts of protocols like IDMP, RSIP, IPv6 may be used in some of the exemplary embodiments. For example, address translation from IDMP and destination option from IPv6 can be reused in some embodiments instead of inventing a new signaling option.

IPv6 in NAT domain: With an IPv6 NAT domain, there is no need to use private IP addresses, as there will be plenty of IPv6 public addresses. This involves the case when the MN has virtual and actual public IP addresses. However, the NAT device 411 is still used to translate between this IPv6 domain and the external IPv6 public Internet.

Single unified Mobile IP and Simple IP client: One embodiment (not shown) includes a combined unified mobile IP, simple IP and MobileNAT client such that the client can use the best available and best suited mechanism for mobility and network access. For instance, if a foreign agent is not found but a mobility manager is present, then it uses the MobileNAT scheme, whereas if a foreign agent is found and a mobility manager is also present but the user wants to host a service (e.g., web server) then it may use the Mobile IP scheme with a well known external public IP address.

Mobility to 3G network: Some embodiments use the system to provide mobility to a node in 3G network. The NAT, mobility manager and DHCP server sit on the packet data serving node (PDSN) of the 3G network.

Paging using IP multicast: Some embodiments may reuse existing IP multicast based paging mechanisms in MobileNAT.

Multiple NAT for load balancing: In some embodiments, it may be desirable to share the address translation load among multiple distributed NAT devices in a single domain. Secondly, in some embodiments, a network can have more than one NAT devices along the path from MN to CN.

Services by mobile node using DNS updates or public IP address: If a mobile user wants to host a public service (e.g., web server or media server) it should be accessible from outside the NAT domain. This is a generic problem with NAT. In some embodiments, the MobileNAT system is extended to allow leasing a public virtual IP address to the internal node from the external public address pool available with the NAT device. Alternatively, dynamic DNS updates can be used to update the host name to IP address mapping for the mobile node.

AAA integration: In some embodiments, the system may integrate with existing authentication mechanisms, e.g., using Remote Authentication Dial-In User Service (RADIUS), to an external AAA infrastructure.

MobileNAT at both end-points: If MobileNAT is used at both the end-points in the connection, then there is no need for any intermediate NAT device. However, additional signaling is used between the two endpoints to convey the mappings as DHCP can not be used.

Change in the client: In the examples described above, the client software is changed (installing the shim layer driver 200 and running the MobileNAT client 1201). Even Mobile IP requires change in the client software. An alternative approach could be to move the address translation function from the shim layer to the default gateway (or foreign agent) in the sub-net. However, this alternative approach requires deploying foreign agents in every domain. Changing the client machine may be easier than change in the infrastructure, given that installing a new software or driver is simple for the Microsoft Windows users.

Fast hand-off and DHCP latency: DHCP introduces additional latency that is not suitable for fast hand-off. In some embodiments, the DHCP implementation is modified so as to remove the timeouts on mobility (of the mobile node). However this approach implies a non-standard DHCP implementation. Alternatively a different signaling protocol may be used for mobility between the mobile node and the mobility manager.

Intra-domain session in the case of inter-domain mobility: If a mobile node is talking to another node in the same domain, and the mobile node moves to another domain, there can be problems, as noted above. (This kind of problem happens only when there is a collision in the IP address in the new domain.) These can be resolved by user intervention. The user can choose to continue with the existing sessions and do not allow new sessions, or stop the existing sessions and start afresh. An alternative approach is to allocate exclusive-or (independent) range of virtual IP addresses among different NAT domains. This procedurally ensures that a mobile node in one NAT domain does not have the same virtual IP address as another mobile node in a different NAT domain. This may be relatively easy to implement in a single service provider network with multiple NAT domains.

Application layer signaling with NAT: As discussed above, NAT causes problems with application level protocols like SIP, FTP and RTSP that use the IP address in the signaling messages. The NAT implementation should allow helper functions for these protocols to take care of the change in actual IP address without breaking the connection. In some alternative embodiments, existing helper functions in Linux NAT can be used with virtual IP address instead of actual IP address. This approach uses double translation at the NAT device, first from actual IP to virtual IP and then from virtual IP to the external public IP address of the NAT device.

In some embodiments, intra-domain sessions are optimized to reduce load on the NAT.

The exemplary embodiment does not require any change in the routing infrastructure in the domain and does not require any foreign agent. A domain wide DHCP server, NAT and mobility manager are deployed. Most routers have built-in address translation functions that can be enabled.

Midcomm framework allows separating the mobility manager from the NAT device.

The exemplary embodiments are easy to use and easy to deploy.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, ZIP™ disks, flash memory, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for use at a mobile node, the method comprising:
    transmitting, from the mobile node toward a network device, a request for an address for the mobile node; and
    receiving, at the mobile node, a message comprising an actual IP address assigned to the mobile node and a virtual IP address assigned to the mobile node, wherein the virtual IP address does not change when the mobile node moves intra-domain or inter-domain;
    wherein the mobile node comprises a network layer and a network interface, wherein the mobile node comprises an intermediate driver configured to facilitate communications between the network layer and the network interface, wherein the network layer and the intermediate driver communicate using the virtual IP address, wherein the network interface and the intermediate driver communicate using the actual IP address.

2. The method of claim 1, wherein the request is a DHCP request indicative that the mobile node does not have a virtual IP address assigned thereto.

3. The method of claim 1, further comprising:
    transmitting, from the mobile node toward the network device, a further request to renew a lease of the actual IP address; and
    receiving, at the mobile node, a message indicative that the further request to renew the lease of the actual IP address has been denied.

4. The method of claim 3, wherein the further request to renew the lease of the actual IP address comprises the virtual IP address of the mobile node and the actual IP address of the mobile node.

5. The method of claim 3, wherein the further request to renew the lease of the actual IP address is denied when (1) the actual IP address was assigned when the mobile node was in a first subnet and (2) the further request to renew the lease of the actual IP address is transmitted when the mobile node is in a second subnet.

6. The method of claim 3, further comprising:
    in response to receiving the message indicative that the further request to renew the lease of the actual IP address has been denied:
        transmitting a new request, from the mobile node toward the network device, wherein the new request comprises the virtual IP address of the mobile node.

7. The method of claim 6, further comprising:
    receiving, at the mobile node, a message comprising a new actual IP address assigned to the mobile node and mapped to the virtual IP address for the mobile node.

8. The method of claim 1, wherein the request for an address for the mobile node transmitted toward the network device is a first request for an address for the mobile node that is transmitted toward a first NAT device in a first NAT domain, wherein the virtual IP address assigned to the mobile node is a first virtual IP address, the method further comprising:
    transmitting, from the mobile node toward a second NAT device in a second NAT domain, a second request for an address for the mobile node; and
    receiving, at the mobile node, a message comprising a second virtual IP address assigned to the mobile node.

9. The method of claim 8, wherein the second request for an address for the mobile node comprises the first virtual IP address of the mobile node and an address of a mobility manager associated with the first NAT device.

10. The method of claim 8, wherein the mobile node sets the second virtual IP address as a preferred virtual IP address for the mobile node.

11. The method of claim 8, wherein the mobile node uses the first virtual IP address for any connections existing before receiving the message including the second virtual IP address, wherein the mobile node uses the second virtual IP address for any connections initiated after receiving the message including the second virtual IP address.

12. A method for use at a mobile node comprising a network layer and a network interface, the method comprising:
    receiving, at an intermediate driver of the mobile node, a packet from the network layer of the mobile node, wherein the packet is received from the network layer using a virtual IP address to identify the mobile node; and
    providing the packet from the intermediate driver of the mobile node to the network interface of the mobile node, wherein the packet is provided to the network interface using an actual IP address to identify the mobile node;
    wherein the intermediate driver permits the actual IP address to change when the mobile node moves intra-domain or inter-domain without a corresponding change in the virtual IP address.

13. The method of claim 12, wherein the intermediate driver translates a source IP address of the received packet from the virtual IP address to the actual IP address and transmits the packet from the mobile node using the actual IP address as the source IP address.

14. The method of claim 12, further comprising:
prior to receiving the packet at the intermediate driver of the mobile node, initiating from the mobile node a request for an IP address and receiving at the mobile node a message comprising the actual IP address assigned to the mobile node and the virtual IP address assigned to the mobile node.

15. A method for use by a mobile node, the method comprising:
receiving a packet comprising a source IP address, wherein the source IP address is a virtual IP address of the mobile node, wherein the packet is received from an application of the mobile node, wherein the packet is received at an intermediate driver of the mobile node, wherein the intermediate driver is configured to facilitate communications between a network layer of the mobile node and a network interface of the mobile node;
translating, at the intermediate driver, the source IP address of the packet from the virtual IP address of the mobile node to an actual IP address of the mobile node; and
transmitting, via the network interface of the mobile node, the packet with the actual IP address as the source IP address;
wherein the actual IP address is adapted for being changed, when the mobile node moves intra-domain or inter-domain, without changing the virtual IP address.

16. The method of claim 15, wherein the virtual IP address is used for maintaining a transport level protocol connection while the mobile node moves between a first subnet and a second subnet.

17. The method of claim 15, wherein the packet is a first packet, wherein the actual IP address is a first actual IP address assigned to the mobile node while the mobile node is associated with a first subnet, wherein a second actual IP address is assigned to the mobile node when the mobile node is associated with a second subnet, the method further comprising:
receiving, from an application in the mobile node, a second packet comprising a source IP address, wherein the source IP address of the second packet is the virtual IP address of the mobile node;
translating the source IP address of the second packet from the virtual IP address of the mobile node to the second actual IP address of the mobile node; and
transmitting, from the mobile node, the second packet with the second actual IP address as the source IP address.

18. The method of claim 15, wherein the actual IP address is a local private address, the method further comprising:
translating the source IP address of the packet from the actual IP address of the mobile node to a public IP address; and
transmitting, from the mobile node, the packet with the public IP address as the source IP address.

19. The method of claim 18, further comprising:
receiving, at the mobile node, an incoming packet from a corresponding node, the incoming packet comprising a destination IP address, wherein the destination IP address of the received packet is the actual IP address of the mobile node;
translating the destination IP address of the received packet from the actual IP address of the mobile node to the virtual IP address of the mobile node; and
providing the packet, with the virtual IP address as the destination IP address, for delivery to an application in the mobile node.

20. A method for use by a dynamic host configuration protocol (DHCP) server, the method comprising:
receiving a DHCP request of a mobile node;
assigning a virtual IP address to the mobile node, wherein the virtual IP address does not change when the mobile node moves intra-domain or inter-domain;
assigning an actual IP address to the mobile node;
transmitting, toward the mobile node, a message including the virtual IP address and the actual IP address;
receiving a further request from the mobile node to renew a lease of the actual IP address;
determining whether the further request is accepted or denied based on a subnet with which the mobile node is associated;
propagating, toward the mobile node based on a determination that the further request is denied, a message indicating that the further request has been denied;
receiving a new request from the mobile node when the further request is denied, wherein the new request identifies the virtual IP address of the mobile node;
assigning a new actual IP address to the mobile node in response to the new request; and
propagating, toward the mobile node, a message indicating that the new request has been accepted, wherein the message indicating that the new request has been accepted comprises the new actual IP addressed assigned to the mobile node.

21. The method of claim 20, further comprising:
propagating, toward a mobility manager function, a request for the mobility manager function to initiate a change to a mapping table in a network address translation device so that the new actual IP address is associated with the virtual IP address in the mapping table.

* * * * *